US009710144B2

(12) United States Patent
Jubner et al.

(10) Patent No.: US 9,710,144 B2
(45) Date of Patent: *Jul. 18, 2017

(54) USER INTERFACE FOR CURVED INPUT DEVICE

(71) Applicant: Neonode Inc., Santa Clara, CA (US)

(72) Inventors: Alexander Jubner, Stockholm (SE); Thomas Eriksson, Stockholm (SE); Gunnar Martin Fröjdh, Dalarö (SE); Simon Fellin, Sigtuna (SE); Stefan Holmgren, Sollentuna (SE)

(73) Assignee: Neonode Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/805,445

(22) Filed: Jul. 21, 2015

(65) Prior Publication Data

US 2015/0324111 A1 Nov. 12, 2015

Related U.S. Application Data

(63) Continuation of application No. 14/590,010, filed on Jan. 6, 2015, now Pat. No. 9,092,093, which is a
(Continued)

(51) Int. Cl.
| | |
|---|---|
| *G06F 7/00* | (2006.01) |
| *G06F 3/0484* | (2013.01) |
| *G06F 3/042* | (2006.01) |
| *G06F 3/01* | (2006.01) |
| *G06F 3/041* | (2006.01) |
| *G06F 3/0488* | (2013.01) |
| *B62D 1/04* | (2006.01) |
| *B60K 37/06* | (2006.01) |
| *G06F 3/033* | (2013.01) |
| *G06F 3/0487* | (2013.01) |

(52) U.S. Cl.
CPC .......... *G06F 3/04847* (2013.01); *B60K 37/06* (2013.01); *B62D 1/04* (2013.01);
(Continued)

(58) Field of Classification Search
CPC ...... B60K 2350/928; B60K 2350/1012; B60K 2350/1036; B60K 37/06; B62D 1/046
(Continued)

(56) References Cited

U.S. PATENT DOCUMENTS

| | | | |
|---|---|---|---|
| 4,243,879 A | 1/1981 | Carroll et al. | |
| 4,301,447 A | 11/1981 | Funk et al. | |

(Continued)

FOREIGN PATENT DOCUMENTS

| | | |
|---|---|---|
| EP | 0330767 A1 | 9/1989 |
| EP | 0513694 A2 | 11/1992 |

(Continued)

OTHER PUBLICATIONS

Moeller et al., ZeroTouch: An Optical Multi-Touch and Free-Air Interaction Architecture, Proc. CHI 2012 Proceedings of the 2012 Annual Conference Extended Abstracts on Human Factors in Computing Systems, May 5, 2012, pp. 2165-2174, ACM, New York, NY, USA.

(Continued)

*Primary Examiner* — Gertrude Arthur Jeanglaud
(74) *Attorney, Agent, or Firm* — Soquel Group LLC

(57) ABSTRACT

A computer readable medium storing instructions which cause a processor to generate data structures for an object moving along the perimeter of a curved touch-sensitive user input device, each data structure corresponding to a gesture and including a time stamp, polar angles at which the object starts and ends, a middle polar angle of the object, and an assigned state being one of the group RECOGNIZED, UPDATED and ENDED, wherein the instructions cause the processor to assign the RECOGNIZED state to the data structure when the moving object is initially detected on the perimeter of the device, to assign the UPDATED state to the data structure when the moving object is further detected on the perimeter of the device after the initial detection, and to assign the ENDED state to the data structure when the moving object ceases to be detected on the perimeter of the device.

15 Claims, 19 Drawing Sheets

Related U.S. Application Data continuation-in-part of application No. 14/551,096, filed on Nov. 24, 2014, now Pat. No. 9,389,710, and a continuation-in-part of application No. 14/555,731, filed on Nov. 28, 2014, said application No. 14/551,096 is a continuation of application No. 14/312,711, filed on Jun. 24, 2014, now Pat. No. 8,918,252, which is a continuation of application No. 14/088,458, filed on Nov. 25, 2013, now Pat. No. 8,775,023, said application No. 14/455,731 is a continuation-in-part of application No. 14/312,787, filed on Jun. 24, 2014, now Pat. No. 9,164,625, and a continuation-in-part of application No. 14/311,366, filed on Jun. 23, 2014, now Pat. No. 9,063,614, and a continuation-in-part of application No. 14/140,635, filed on Dec. 26, 2013, now Pat. No. 9,001,087, said application No. 14/312,787 is a continuation of application No. PCT/US2014/040112, filed on May 30, 2014, said application No. 14/311,366 is a continuation of application No. PCT/US2014/040579, filed on Jun. 3, 2014.

(60) Provisional application No. 61/730,139, filed on Nov. 27, 2012, provisional application No. 61/828,713, filed on May 30, 2013, provisional application No. 61/838,296, filed on Jun. 23, 2013, provisional application No. 61/846,089, filed on Jul. 15, 2013, provisional application No. 61/929,992, filed on Jan. 22, 2014, provisional application No. 61/972,435, filed on Mar. 31, 2014, provisional application No. 61/986,341, filed on Apr. 30, 2014, provisional application No. 61/830,671, filed on Jun. 4, 2013, provisional application No. 61/833,161, filed on Jun. 10, 2013, provisional application No. 61/911,915, filed on Dec. 4, 2013, provisional application No. 61/919,759, filed on Dec. 22, 2013, provisional application No. 61/923,775, filed on Jan. 6, 2014, provisional application No. 61/950,868, filed on Mar. 11, 2014.

(52) U.S. Cl.
CPC ............ *B62D 1/046* (2013.01); *G06F 3/017* (2013.01); *G06F 3/0416* (2013.01); *G06F 3/0421* (2013.01); *G06F 3/0488* (2013.01); *G06F 3/04842* (2013.01); *B60K 2350/1012* (2013.01); *B60K 2350/1036* (2013.01); *B60K 2350/928* (2013.01); *G06F 3/033* (2013.01); *G06F 3/0487* (2013.01); *G06F 2203/0339* (2013.01); *H04M 2250/22* (2013.01)

(58) Field of Classification Search
USPC .............................. 701/36, 41, 418; 345/175
See application file for complete search history.

(56) References Cited

U.S. PATENT DOCUMENTS

| | | |
|---|---|---|
| 4,518,249 A | 5/1985 | Murata et al. |
| 4,550,250 A | 10/1985 | Mueller et al. |
| 4,703,316 A | 10/1987 | Sherbeck |
| 4,710,760 A | 12/1987 | Kasday |
| 4,782,328 A | 11/1988 | Denlinger |
| 4,790,028 A | 12/1988 | Ramage |
| 4,847,606 A | 7/1989 | Beiswenger |
| 4,880,969 A | 11/1989 | Lawrie |
| 4,928,094 A | 5/1990 | Smith |
| 5,003,505 A | 3/1991 | McClelland |
| 5,016,008 A | 5/1991 | Gruaz et al. |
| 5,036,187 A | 7/1991 | Yoshida et al. |
| 5,053,758 A | 10/1991 | Cornett et al. |
| 5,103,085 A | 4/1992 | Zimmerman |
| 5,119,079 A | 6/1992 | Hube et al. |
| 5,162,783 A | 11/1992 | Moreno |
| 5,179,369 A | 1/1993 | Person et al. |
| 5,194,863 A | 3/1993 | Barker et al. |
| 5,220,409 A | 6/1993 | Bures |
| 5,283,558 A | 2/1994 | Chan |
| 5,406,307 A | 4/1995 | Hirayama et al. |
| 5,414,413 A | 5/1995 | Tamaru et al. |
| 5,422,494 A | 6/1995 | West et al. |
| 5,463,725 A | 10/1995 | Henckel et al. |
| 5,559,727 A | 9/1996 | Deley et al. |
| 5,577,733 A | 11/1996 | Downing |
| 5,579,035 A | 11/1996 | Beiswenger |
| 5,603,053 A | 2/1997 | Gough et al. |
| 5,612,719 A | 3/1997 | Beernink et al. |
| 5,618,232 A | 4/1997 | Martin |
| 5,729,250 A | 3/1998 | Bishop et al. |
| 5,748,185 A | 5/1998 | Stephan et al. |
| 5,785,439 A | 7/1998 | Bowen |
| 5,825,352 A | 10/1998 | Bisset et al. |
| 5,838,308 A | 11/1998 | Knapp et al. |
| 5,880,743 A | 3/1999 | Moran et al. |
| 5,886,697 A | 3/1999 | Naughton et al. |
| 5,889,236 A | 3/1999 | Gillespie et al. |
| 5,900,875 A | 5/1999 | Haitani et al. |
| 5,914,709 A | 6/1999 | Graham et al. |
| 5,936,615 A | 8/1999 | Waters |
| 5,943,043 A | 8/1999 | Furuhata et al. |
| 5,943,044 A | 8/1999 | Martinelli et al. |
| 5,956,030 A | 9/1999 | Conrad et al. |
| 5,988,645 A | 11/1999 | Downing |
| 6,010,061 A | 1/2000 | Howell |
| 6,023,265 A | 2/2000 | Lee |
| 6,031,989 A | 2/2000 | Cordell |
| 6,052,279 A | 4/2000 | Friend et al. |
| 6,073,036 A | 6/2000 | Heikkinen et al. |
| 6,085,204 A | 7/2000 | Chijiwa et al. |
| 6,091,405 A | 7/2000 | Lowe et al. |
| 6,135,494 A | 10/2000 | Lotito et al. |
| 6,246,395 B1 | 6/2001 | Goyins et al. |
| 6,259,436 B1 | 7/2001 | Moon et al. |
| 6,292,179 B1 | 9/2001 | Lee |
| 6,310,609 B1 | 10/2001 | Morgenthaler |
| 6,323,846 B1 | 11/2001 | Westerman et al. |
| 6,340,979 B1 | 1/2002 | Beaton et al. |
| 6,346,935 B1 | 2/2002 | Nakajima et al. |
| 6,356,287 B1 | 3/2002 | Ruberry et al. |
| 6,359,632 B1 | 3/2002 | Eastty et al. |
| 6,362,468 B1 | 3/2002 | Murakami et al. |
| 6,411,283 B1 | 6/2002 | Murphy |
| 6,421,042 B1 | 7/2002 | Omura et al. |
| 6,429,857 B1 | 8/2002 | Masters et al. |
| 6,456,952 B1 | 9/2002 | Nathan |
| 6,529,920 B1 | 3/2003 | Arons et al. |
| 6,542,191 B1 | 4/2003 | Yonezawa |
| 6,549,217 B1 | 4/2003 | De Greef et al. |
| 6,570,557 B1 | 5/2003 | Westerman et al. |
| 6,597,345 B2 | 7/2003 | Hirshberg |
| 6,628,268 B1 | 9/2003 | Harada et al. |
| 6,639,584 B1 | 10/2003 | Li |
| 6,646,633 B1 | 11/2003 | Nicolas |
| 6,677,932 B1 | 1/2004 | Westerman |
| 6,690,365 B2 | 2/2004 | Hinckley et al. |
| 6,690,387 B2 | 2/2004 | Zimmerman et al. |
| 6,703,999 B1 | 3/2004 | Iwanami et al. |
| 6,707,449 B2 | 3/2004 | Hinckley et al. |
| 6,727,917 B1 | 4/2004 | Chew et al. |
| 6,734,883 B1 | 5/2004 | Wynn et al. |
| 6,757,002 B1 | 6/2004 | Oross et al. |
| 6,788,292 B1 | 9/2004 | Nako et al. |
| 6,803,906 B1 | 10/2004 | Morrison et al. |
| 6,833,827 B2 | 12/2004 | Lui et al. |
| 6,836,367 B2 | 12/2004 | Seino et al. |
| 6,857,746 B2 | 2/2005 | Dyner |
| 6,864,882 B2 | 3/2005 | Newton |
| 6,874,683 B2 | 4/2005 | Keronen et al. |
| 6,888,536 B2 | 5/2005 | Westerman et al. |
| 6,944,557 B2 | 9/2005 | Hama et al. |

(56) References Cited

U.S. PATENT DOCUMENTS

| | | |
|---|---|---|
| 6,947,032 B2 | 9/2005 | Morrison et al. |
| 6,954,197 B2 | 10/2005 | Morrison et al. |
| 6,958,749 B1 | 10/2005 | Matsushita et al. |
| 6,972,401 B2 | 12/2005 | Akitt et al. |
| 6,988,246 B2 | 1/2006 | Kopitzke et al. |
| 6,992,660 B2 | 1/2006 | Kawano et al. |
| 7,006,077 B1 | 2/2006 | Uusimaki |
| 7,007,239 B1 | 2/2006 | Hawkins et al. |
| 7,030,861 B1 | 4/2006 | Westerman et al. |
| 7,046,232 B2 | 5/2006 | Inagaki et al. |
| 7,126,583 B1 | 10/2006 | Breed |
| 7,133,032 B2 | 11/2006 | Cok |
| 7,155,683 B1 | 12/2006 | Williams |
| 7,159,763 B2 | 1/2007 | Yap et al. |
| 7,176,905 B2 | 2/2007 | Baharav et al. |
| 7,184,030 B2 | 2/2007 | McCharles et al. |
| 7,221,462 B2 | 5/2007 | Cavallucci |
| 7,225,408 B2 | 5/2007 | O'Rourke |
| 7,232,986 B2 | 6/2007 | Worthington et al. |
| 7,254,775 B2 | 8/2007 | Geaghan et al. |
| 7,265,748 B2 | 9/2007 | Ryynanen |
| 7,283,845 B2 | 10/2007 | De Bast |
| 7,286,063 B2 | 10/2007 | Gauthey et al. |
| RE40,153 E | 3/2008 | Westerman et al. |
| 7,339,580 B2 | 3/2008 | Westerman et al. |
| 7,352,940 B2 | 4/2008 | Charters et al. |
| 7,355,594 B2 | 4/2008 | Barkan |
| 7,369,724 B2 | 5/2008 | Deane |
| 7,372,456 B2 | 5/2008 | McLintock |
| 7,429,706 B2 | 9/2008 | Ho |
| 7,435,940 B2 | 10/2008 | Eliasson et al. |
| 7,441,196 B2 | 10/2008 | Gottfurcht et al. |
| 7,441,800 B2 | 10/2008 | Weber et al. |
| 7,442,914 B2 | 10/2008 | Eliasson et al. |
| 7,464,110 B2 | 12/2008 | Pyhalammi et al. |
| 7,465,914 B2 | 12/2008 | Eliasson et al. |
| 7,469,381 B2 | 12/2008 | Ording |
| 7,474,772 B2 | 1/2009 | Russo et al. |
| 7,479,949 B2 | 1/2009 | Jobs et al. |
| 7,518,738 B2 | 4/2009 | Cavallucci et al. |
| 7,587,072 B2 | 9/2009 | Russo et al. |
| 7,633,300 B2 | 12/2009 | Keroe et al. |
| 7,663,607 B2 | 2/2010 | Hotelling et al. |
| 7,705,835 B2 | 4/2010 | Eikman |
| 7,742,290 B1 | 6/2010 | Kaya |
| 7,782,296 B2 | 8/2010 | Kong et al. |
| 7,812,828 B2 | 10/2010 | Westerman et al. |
| 7,855,716 B2 | 12/2010 | McCreary et al. |
| 7,880,724 B2 | 2/2011 | Nguyen et al. |
| 7,880,732 B2 | 2/2011 | Goertz |
| 8,022,941 B2 | 9/2011 | Smoot |
| 8,026,798 B2 | 9/2011 | Makinen et al. |
| 8,068,101 B2 | 11/2011 | Goertz |
| 8,095,879 B2 | 1/2012 | Goertz |
| 8,120,625 B2 | 2/2012 | Hinckley |
| 8,193,498 B2 | 6/2012 | Cavallucci et al. |
| 8,289,299 B2 | 10/2012 | Newton |
| 8,564,424 B2 | 10/2013 | Evarts et al. |
| 8,933,876 B2 | 1/2015 | Galor et al. |
| 9,092,093 B2* | 7/2015 | Jubner ............... G06F 3/04842 |
| 2002/0152010 A1 | 10/2002 | Colmenarez et al. |
| 2002/0158453 A1 | 10/2002 | Levine |
| 2003/0086588 A1 | 5/2003 | Shinada et al. |
| 2004/0199309 A1 | 10/2004 | Hayashi et al. |
| 2005/0021190 A1 | 1/2005 | Worrell et al. |
| 2005/0052426 A1 | 3/2005 | Hagermoser et al. |
| 2006/0047386 A1 | 3/2006 | Kanevsky et al. |
| 2008/0211779 A1 | 9/2008 | Pryor |
| 2009/0139778 A1 | 6/2009 | Butler et al. |
| 2009/0166098 A1 | 7/2009 | Sunder |
| 2009/0278915 A1 | 11/2009 | Kramer et al. |
| 2009/0322673 A1 | 12/2009 | Cherradi El Fadili |
| 2010/0185341 A1 | 7/2010 | Wilson et al. |
| 2011/0030502 A1 | 2/2011 | Lathrop |
| 2011/0050589 A1 | 3/2011 | Yan et al. |
| 2011/0241850 A1 | 10/2011 | Bosch et al. |
| 2011/0310005 A1 | 12/2011 | Chen et al. |
| 2012/0109455 A1 | 5/2012 | Newman et al. |
| 2012/0179328 A1 | 7/2012 | Goldman-Shenhar |
| 2012/0283894 A1 | 11/2012 | Naboulsi |
| 2012/0326735 A1 | 12/2012 | Bennett et al. |
| 2013/0024071 A1 | 1/2013 | Sivertsen |
| 2013/0204457 A1 | 8/2013 | King et al. |
| 2014/0081521 A1 | 3/2014 | Frojdh et al. |
| 2015/0100204 A1 | 4/2015 | Gondo |

FOREIGN PATENT DOCUMENTS

| | | |
|---|---|---|
| EP | 0601651 A1 | 6/1994 |
| EP | 0618528 A1 | 10/1994 |
| EP | 0703525 A1 | 3/1996 |
| EP | 1059603 A2 | 12/2000 |
| GB | 1107666 A | 3/1968 |
| GB | 2319997 A | 6/1998 |
| GB | 2423808 A | 9/2006 |
| JP | 03216719 A | 9/1991 |
| JP | 5173699 A | 7/1993 |
| JP | 10269012 A | 7/1993 |
| JP | 10-148640 A | 6/1998 |
| JP | 11232024 A | 8/1999 |
| JP | 2001216069 A | 8/2001 |
| JP | 3240941 B2 | 12/2001 |
| JP | 2009-248629 A | 10/2009 |
| JP | 2011254957 A | 12/2011 |
| JP | 2012181639 A | 9/2012 |
| JP | 2014-225145 A | 12/2014 |
| WO | 8600446 A1 | 1/1986 |
| WO | 8600447 A1 | 1/1986 |
| WO | 9615464 A1 | 5/1996 |
| WO | 0102949 A1 | 1/2001 |
| WO | 0140922 A2 | 6/2001 |
| WO | 02095668 A1 | 11/2002 |
| WO | 03038592 A1 | 5/2003 |
| WO | 03083767 A2 | 10/2003 |
| WO | 2005026938 A2 | 3/2005 |
| WO | 2008147266 A1 | 12/2008 |
| WO | 2009008786 A1 | 1/2009 |
| WO | 2010093570 A1 | 8/2010 |
| WO | 2010121031 A1 | 10/2010 |
| WO | 2011119483 A1 | 9/2011 |

OTHER PUBLICATIONS

Moeller et al., ZeroTouch: A Zero-Thickness Optical Multi-Touch Force Field, CHI EA '11 Proceedings of the 2011 Annual Conference Extended Abstracts on Human Factors in Computing Systems, May 2011, pp. 1165-1170, ACM, New York, NY, USA.

Moeller et al., IntangibleCanvas: Free-Air Finger Painting on a Projected Canvas, CHI EA '11 Proceedings of the 2011 Annual Conference Extended Abstracts on Human Factors in Computing Systems, May 2011, pp. 1615-1620, ACM New York, NY, USA.

Myers, Mobile Devices for Control, Mobile HCI 2002, LNCS 2411, pp. 1-8, 2002, Springer-Verlag, Heidelberg, Germany.

Myers et al, Two-Handed Input Using a PDA and a Mouse, CHI 2000 CHI Letters, Apr. 2000, pp. 1-6, vol. 2, Issue 1.

Myers, Using Handhelds and PCs Together, Communications of the ACM, Nov. 2001, vol. 44, No. 11, ACM, New York, NY, USA.

European Patent Application No. 15 160 235.6, Extended European Search Report, Nov. 26, 2015, 5 pages.

* cited by examiner

Autonomous Drive User Interface (a)

(b)          (c)

Phone Call User Interface

USER INTERFACE FOR CURVED INPUT DEVICE

CROSS REFERENCES TO RELATED APPLICATIONS

This application is a continuation of U.S. application Ser. No. 14/510,090, now U.S. Pat. No. 9,092,093, entitled STEERING WHEEL USER INTERFACE and filed on Jan. 6, 2015 by inventors Alexander Jubner, Thomas Eriksson, Gunnar Martin Fröjdh, Simon Fellin and Stefan Holmgren. U.S. application Ser. No. 14/510,090 is a continuation-in-part of U.S. application Ser. No. 14/551,096, now U.S. Pat. No. 9,389,710, entitled LIGHT-BASED CONTROLS IN A TOROIDAL STEERING WHEEL and filed on Nov. 24, 2014, by inventors Gunnar Martin Fröjdh, Simon Fellin, Thomas Eriksson, John Karlsson, Maria Hedin and Richard Berglind, the contents of which are hereby incorporated herein in their entirety.

U.S. application Ser. No. 14/510,090 is a continuation-in-part of U.S. application Ser. No. 14/555,731 entitled DOOR HANDLE WITH OPTICAL PROXIMITY SENSORS and filed on Nov. 28, 2014, by inventors Sairam Iyer, Stefan Holmgren and Per Rosengren, the contents of which are hereby incorporated herein in their entirety.

U.S. application Ser. No. 14/551,096 is a continuation of U.S. application Ser. No. 14/312,711, now U.S. Pat. No. 8,918,252, entitled LIGHT-BASED TOUCH CONTROLS ON A STEERING WHEEL and filed on Jun. 24, 2014 by inventors Gunnar Martin Fröjdh, Simon Fellin, Thomas Eriksson, John Karlsson, Maria Hedin and Richard Berglind, the contents of which are hereby incorporated herein in their entirety.

U.S. application Ser. No. 14/312,711 is a continuation of U.S. application Ser. No. 14/088,458, now U.S. Pat. No. 8,775,023, entitled LIGHT-BASED TOUCH CONTROLS ON A STEERING WHEEL AND DASHBOARD and filed on Nov. 25, 2013 by inventors Gunnar Martin Fröjdh, Simon Fellin, Thomas Eriksson, John Karlsson, Maria Hedin and Richard Berglind, the contents of which are hereby incorporated herein in their entirety.

U.S. application Ser. No. 14/088,458 is a non-provisional of U.S. Provisional Application No. 61/730,139 entitled LIGHT-BASED TOUCH CONTROLS ON A STEERING WHEEL AND DASHBOARD and filed on Nov. 27, 2012 by inventors Gunnar Martin Fröjdh, Thomas Eriksson, John Karlsson, Maria Hedin and Richard Berglind, the contents of which are hereby incorporated herein in their entirety.

U.S. application Ser. No. 14/555,731 is a continuation-in-part of U.S. application Ser. No. 14/312,787, now U.S. Pat. No. 9,164,625, entitled OPTICAL PROXIMITY SENSORS and filed on Jun. 24, 2014 by inventors Stefan Holmgren, Sairam Iyer, Richard Berglind, Karl Erik Patrik Nordström, Lars Sparf, Per Rosengren, Erik Rosengren, John Karlsson, Thomas Eriksson, Alexander Jubner, Remo Behdasht, Simon Fellin, Robin Åman and Joseph Shain, the contents of which are hereby incorporated herein in their entirety.

U.S. application Ser. No. 14/555,731 is a continuation-in-part of U.S. application Ser. No. 14/311,366, now U.S. Pat. No. 9,063,614, entitled OPTICAL TOUCH SCREENS and filed on Jun. 23, 2014 by inventors Robert Pettersson, Per Rosengren, Erik Rosengren, Stefan Holmgren, Lars Sparf, Richard Berglind, Thomas Eriksson, Karl Erik Patrik Nordström, Gunnar Martin Fröjdh, Xiatao Wang and Remo Behdasht, the contents of which are hereby incorporated herein in their entirety.

U.S. application Ser. No. 14/555,731 is a continuation-in-part of U.S. application Ser. No. 14/140,635, now U.S. Pat. No. 9,001,087, entitled LIGHT-BASED PROXIMITY DETECTION SYSTEM AND USER INTERFACE and filed on Dec. 26, 2013 by inventors Thomas Eriksson and Stefan Holmgren, the contents of which are hereby incorporated herein in their entirety.

U.S. application Ser. No. 14/312,787 is a continuation of International Application No. PCT/US14/40112 entitled OPTICAL PROXIMITY SENSORS and filed on May 30, 2014 by inventors Stefan Holmgren, Sairam Iyer, Richard Berglind, Karl Erik Patrik Nordström, Lars Sparf, Per Rosengren, Erik Rosengren, John Karlsson, Thomas Eriksson, Alexander Jubner, Remo Behdasht, Simon Fellin, Robin Åman and Joseph Shain, the contents of which are hereby incorporated herein in their entirety.

International Application No. PCT/US14/40112 claims priority benefit of U.S. Provisional Application No. 61/828,713 entitled OPTICAL TOUCH SCREEN SYSTEMS USING REFLECTED LIGHT and filed on May 30, 2013 by inventors Per Rosengren, Lars Sparf, Erik Rosengren and Thomas Eriksson; of U.S. Provisional Application No. 61/838,296 entitled OPTICAL GAME ACCESSORIES USING REFLECTED LIGHT and filed on Jun. 23, 2013 by inventors Per Rosengren, Lars Sparf, Erik Rosengren, Thomas Eriksson, Joseph Shain, Stefan Holmgren, John Karlsson and Remo Behdasht; of U.S. Provisional Application No. 61/846,089 entitled PROXIMITY SENSOR FOR LAPTOP COMPUTER AND ASSOCIATED USER INTERFACE and filed on Jul. 15, 2013 by inventors Richard Berglind, Thomas Eriksson, Simon Fellin, Per Rosengren, Lars Sparf, Erik Rosengren, Joseph Shain, Stefan Holmgren, John Karlsson and Remo Behdasht; of U.S. Provisional Application No. 61/929,992 entitled CLOUD GAMING USER INTERFACE filed on Jan. 22, 2014 by inventors Thomas Eriksson, Stefan Holmgren, John Karlsson, Remo Behdasht, Erik Rosengren, Lars Sparf and Alexander Jubner; of U.S. Provisional Application No. 61/972,435 entitled OPTICAL TOUCH SCREEN SYSTEMS and filed on Mar. 31, 2014 by inventors Sairam Iyer, Karl Erik Patrik Nordström, Lars Sparf, Per Rosengren, Erik Rosengren, Thomas Eriksson, Alexander Jubner and Joseph Shain; and of U.S. Provisional Application No. 61/986,341 entitled OPTICAL TOUCH SCREEN SYSTEMS and filed on Apr. 30, 2014 by inventors Sairam Iyer, Karl Erik Patrik Nordström, Lars Sparf, Per Rosengren, Erik Rosengren, Thomas Eriksson, Alexander Jubner and Joseph Shain, the contents of which are hereby incorporated herein in their entirety.

U.S. application Ser. No. 14/311,366 is a continuation of International Application No. PCT/US14/40579 entitled OPTICAL TOUCH SCREENS and filed on Jun. 3, 2014 by inventors Robert Pettersson, Per Rosengren, Erik Rosengren, Stefan Holmgren, Lars Sparf, Richard Berglind, Thomas Eriksson, Karl Erik Patrik Nordström, Gunnar Martin Fröjdh, Xiatao Wang and Remo Behdasht, the contents of which are hereby incorporated herein in their entirety.

International Application No. PCT/US14/40579 claims priority benefit of U.S. Provisional Application No. 61/830,671 entitled MULTI-TOUCH OPTICAL TOUCH SCREENS WITHOUT GHOST POINTS and filed on Jun. 4, 2013 by inventors Erik Rosengren, Robert Pettersson, Lars Sparf and Thomas Eriksson; of U.S. Provisional Application No. 61/833,161 entitled CIRCULAR MULTI-TOUCH OPTICAL TOUCH SCREENS and filed on Jun. 10, 2013 by inventors Richard Berglind, Erik Rosengren, Robert Pettersson, Lars Sparf, Thomas Eriksson, Gunnar Martin Fröjdh and Xiatao Wang; of U.S. Provisional Application No. 61/911,915 entitled CIRCULAR MULTI-TOUCH OPTICAL TOUCH SCREENS and filed on Dec. 4, 2013 by inventors Richard Berglind, Erik Rosengren, Robert Pettersson, Lars Sparf, Thomas Eriksson, Gunnar Martin Fröjdh and Xiatao Wang; of U.S. Provisional Application No. 61/919,759 entitled OPTICAL TOUCH SCREENS WITH TOUCH-SENSITIVE BORDERS and filed on Dec. 22, 2013 by inventors Remo Behdasht, Erik Rosengren, Robert Pettersson, Lars Sparf and Thomas Eriksson; of U.S. Provisional Application No. 61/923,775 entitled MULTI-TOUCH OPTICAL TOUCH SCREENS WITHOUT GHOST POINTS and filed on Jan. 6, 2014 by inventors Per Rosengren, Stefan Holmgren, Erik Rosengren, Robert Pettersson, Lars Sparf and Thomas Eriksson; and of U.S. Provisional Application No. 61/950,868 entitled OPTICAL TOUCH SCREENS and filed on Mar. 11, 2014 by inventors Karl Erik Patrik Nordström, Per Rosengren, Stefan Holmgren, Erik Rosengren, Robert Pettersson, Lars Sparf and Thomas Eriksson, the contents of which are hereby incorporated herein in their entirety.

FIELD OF THE INVENTION

The field of the present invention is steering wheel user interfaces for vehicles.

BACKGROUND OF THE INVENTION

Reference is made to FIG. 1, which is a simplified illustration of a prior art steering wheel. A steering wheel 400, shown in FIG. 1, includes a circular gripping member 401, one or more connecting members 402-404 that connect the gripping member 401 to steering column 407, and buttons 405 and 406 on connecting members 402 and 403 for controlling various devices in the vehicle. Connecting members 402-404, which connect gripping member 401 to steering column 407, are also referred to as spokes. In FIG. 1, button 405 is used to answer an incoming phone call on the vehicle's BLUETOOTH® speaker phone and button 406 hangs up the call. BLUETOOTH is a trademark owned by the Bluetooth SIG of Kirkland, Wash., USA. Controls mounted in a steering wheel can be operated comfortably and safely since the driver is able to control and operate these controls without taking hands off the wheel or eyes off the road.

Historically, the first button added to a steering wheel was a switch to activate the car's electric horn. When cruise control systems were introduced, some automakers located the operating switches for this feature on the steering wheel as well. Today additional button controls for an audio system, a telephone and voice control system, a navigation system, a stereo system, and on board computer functions are commonly placed on the steering wheel.

U.S. Patent Publication No. 2012/0232751 A1 for PRESSURE SENSITIVE STEERING WHEEL CONTROLS describes adding pressure-sensitive controls to the circular gripping member of the steering wheel. Pressure sensors are located at various locations along the perimeter of the gripping member, and different locations correspond to different controls. A control is actuated in response to application of pressure at a sensor location, e.g., by the user tightening his grip.

Prior art user interfaces associated with steering wheels, such as the buttons and grips discussed hereinabove, associate a function with an absolute position on the steering wheel. This is conceptually analogous to a touch-sensitive screen displaying icons where the user touches the location on the screen at which the icon is located to activate the icon. The concept of absolute positioning for user input goes back even further: each key on a keyboard is positioned at an absolute position within the keyboard. Similarly, early graphical user interfaces using light pens required the user to place the light pen onto a graphic displayed on the screen in order to activate a corresponding function.

In contrast to these user interfaces based on absolute positioning, the computer mouse introduced a user interface for controlling a cursor based on relative positioning. Namely, the mouse cursor moves on the screen in a direction that the mouse moves from point A to point B, but this movement is not at all contingent on the actual coordinates—the absolute positions—of points A and B. This shift from absolute positioning to relative positioning frees the user from having to look at, or be aware of, the location of the mouse on the table. The user only has to control the direction in which the mouse moves on the table, which he can do without looking at the mouse. One of the objectives of the present invention is to provide a user interface for a driver based on the relative positioning user interface model.

SUMMARY

The present disclosure relates to user interfaces for on board vehicle systems, and teaches a user interface that does not require the user to be aware of the location at which he is touching the steering wheel in order to activate a function. The present disclosure teaches a robust vocabulary of user gestures that can be mapped to a wide variety of applications. The user gestures of the present disclosure are performed with absolute confidence by a user, without the user looking at the surface on which the gestures are performed. In certain embodiments of the invention the gestures are performed on the rim of a steering wheel. The nature of these gestures and the underlying hardware provided for detecting these gestures enables each user interface gesture to be performed by the user without any need for looking at the steering wheel. Furthermore these gestures are entirely independent of how the steering wheel is rotated at the time the gestures are performed.

There is thus provided in accordance with an embodiment of the present invention a steering wheel that identifies gestures performed on its surface, including a circular gripping element including a thumb-receiving notch disposed along its circumference, an array of light-based proximity sensors, mounted in the gripping element, that projects light beams through the notch radially outward from the gripping element, and detects light beams reflected back into the gripping element by a moving object at or near the notch, and a processor, coupled with the proximity sensor array, for determining polar angles along the circumference of the gripping element occupied by the object, responsive to light beams projected by the proximity sensor array and reflected back by the object being detected by the proximity sensor array.

BRIEF DESCRIPTION OF THE DRAWINGS

The present invention will be more fully understood and appreciated from the following detailed description, taken in conjunction with the drawings in which.

Figure 1:
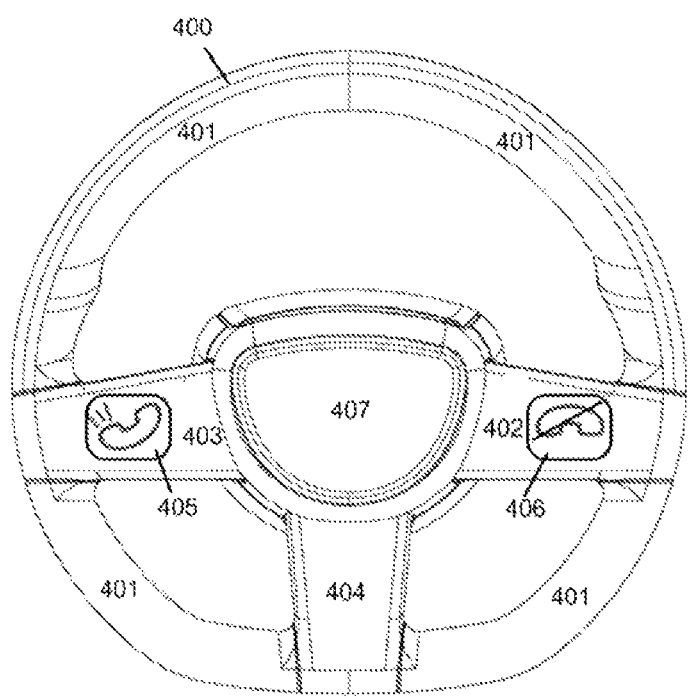
FIG. 1 is a simplified illustration of prior art steering wheel.

In the disclosure and figures, the following numbering scheme is used. Light transmitters are numbered in the 100's, light detectors are numbered in the 200's, light guides and lenses are numbered in the 300's, miscellaneous items are numbered in the 400's, light beams are numbered in the 600's, and flow chart elements are numbered 1000-1100. Like numbered elements are similar but not necessarily identical.

The following tables catalog the numbered elements and list the figures in which each numbered element appears.

| Light Transmitters | |
|---|---|
| Element | FIGS. |
| 100 | 4, 5 |
| 101 | 6 |
| 102 | 6 |
| 105 | 8-10 |
| 106 | 6, 7 |
| 107 | 6, 7 |
| 108 | 6, 7 |
| 109 | 6, 7 |

| Light Detectors | |
|---|---|
| Element | FIGS. |
| 200 | 4 |
| 201 | 6, 8, 9 |
| 202 | 6, 8, 9 |
| 203 | 8, 9 |
| 205 | 8, 9 |
| 206 | 8 |

| Light Guides and Lenses | |
|---|---|
| Element | FIGS. |
| 300 | 2-7 |
| 301 | 8, 9 |
| 302 | 8, 9 |
| 303 | 8, 9 |
| 304 | 8, 9 |
| 305 | 8-10 |

| Miscellaneous Items | | |
|---|---|---|
| Element | FIGS. | Description |
| 400 | 1 | steering wheel |
| 401 | 1 | grip |
| 402 | 1 | right spoke |
| 403 | 1 | left spoke |
| 404 | 1 | bottom spoke |
| 405 | 1 | answer button |
| 406 | 1 | reject button |
| 410 | 12, 14-19 | steering wheel |
| 411 | 2-5 | steering wheel frame |
| 412 | 2-5 | top cover |
| 413 | 2-5 | thumb notch |
| 414 | 2-7 | PCB |
| 415 | 2-5, 7 | light baffle |
| 416 | 3, 5 | transparent cover section |
| 417 | 3, 5 | transparent cover section |
| 418 | 12, 14, 15, 17, 18 | finger |
| 419 | 12, 14, 16-19 | hand |
| 420 | 12, 15 | steering wheel surface |
| 421-424, 428, 431-434 | 12, 15 | hand/finger movement directions |
| 425 | 12 | clock icon |
| 426 | 12 | finger |
| 430 | 14 | double-tap gesture |
| 436 | 14-16 | Illumination |

-continued

Miscellaneous Items

| Element | FIGS. | Description |
|---|---|---|
| 437 | 14 | movement of illumination |
| 438 | 14, 17 | tap gesture |
| 440 | 6, 11 | Processor |
| 441-443 | 11 | network client |
| 444 | 11 | message bus |

Light Beams

| Element | FIGS. | Description |
|---|---|---|
| 601 | 10 | light beam |
| 602 | 3, 8-10 | light beam |
| 603 | 8, 9 | light beam |
| 604 | 8, 9 | light beam |

Flow Chart Stages

| Element | FIGS. | Description |
|---|---|---|
| 1001-1005 | 13 | vehicle application state |
| 1010-1019 | 13 | vehicle application action |

DETAILED DESCRIPTION

Aspects of the present disclosure relate to light-based touch controls that allow a driver to keep his hands on a steering element while operating peripheral electronic devices and automated features in a vehicle.

According to a first embodiment of the invention, a steering wheel is provided with a touch sensitive strip disposed along the entire circumference of the steering wheel. In order to facilitate locating the strip, it is disposed in a thumb receiving notch or groove that is etched or otherwise formed along the circumference of the steering wheel. In addition to a touch sensor, there is also a visible-light illuminator behind or around the touch sensitive strip that is used to indicate the state of the user interface to the user, and also indicate where certain tap gestures should be performed.

A user interface for this steering wheel is designed to be independent of the rotation of the steering wheel. Sweep gestures are clockwise and counter-clockwise so that they are independent of rotation of the wheel. A function is activated in response to a gesture, such as a double-tap, performed anywhere along the circumference of the wheel. The activation of some functions places the user interface into a state in which one or more additional functions can be selectively activated. In order to activate these additional functions, the touch location at which the initial gesture was performed is illuminated and subsequent gestures are performed in relation to the illuminated portion of the wheel. When a portion of the wheel is thus illuminated, and the driver slides his hand along the steering wheel grip, the illuminated portion of the steering wheel follows the hand so that the hand is always next to the location for performing subsequent gestures. Similarly, when the user switches hands gripping the steering wheel, the illumination jumps to the newly gripped part of the wheel.

Figure 2:
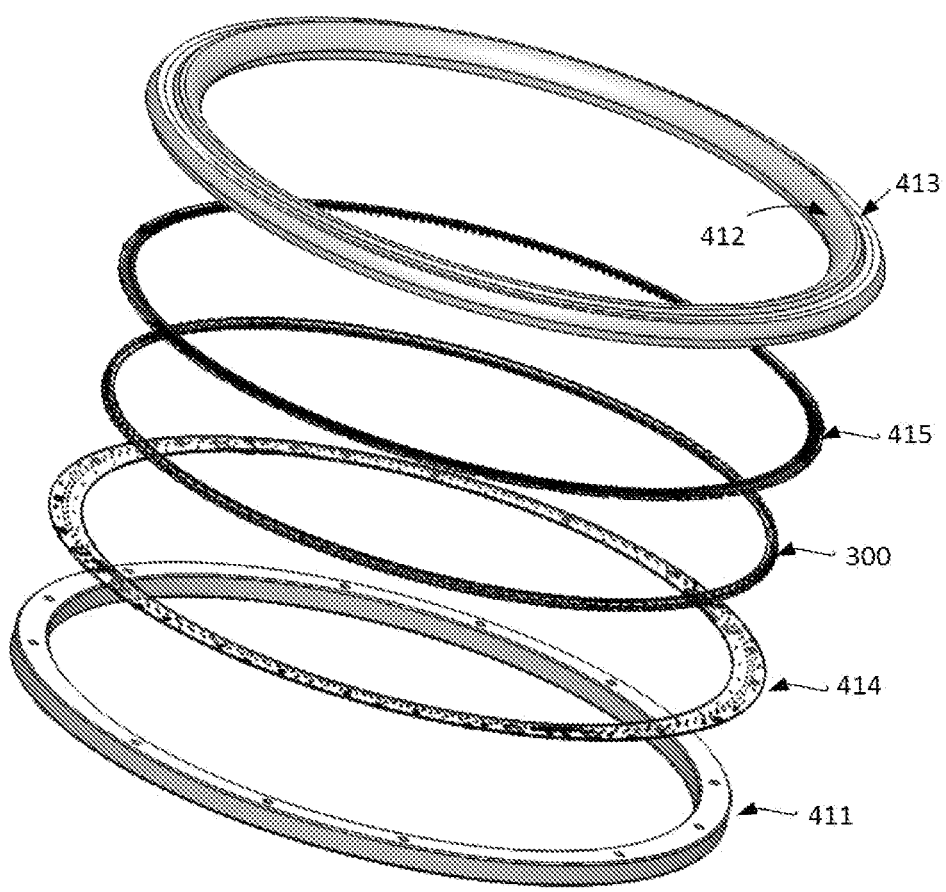
FIG. 2 is an exploded view of a steering wheel, in accordance with a first embodiment of the present invention.

Reference is made to FIG. 2, which is an exploded view of a steering wheel, in accordance with a first embodiment of the present invention. Elements of this steering wheel include steering wheel frame 411, PCB 414, an array of lenses 300, a light baffle structure 415, and a steering wheel top cover 412. A thumb-receiving notch 413 is disposed within steering wheel cover 412.

Figure 3:
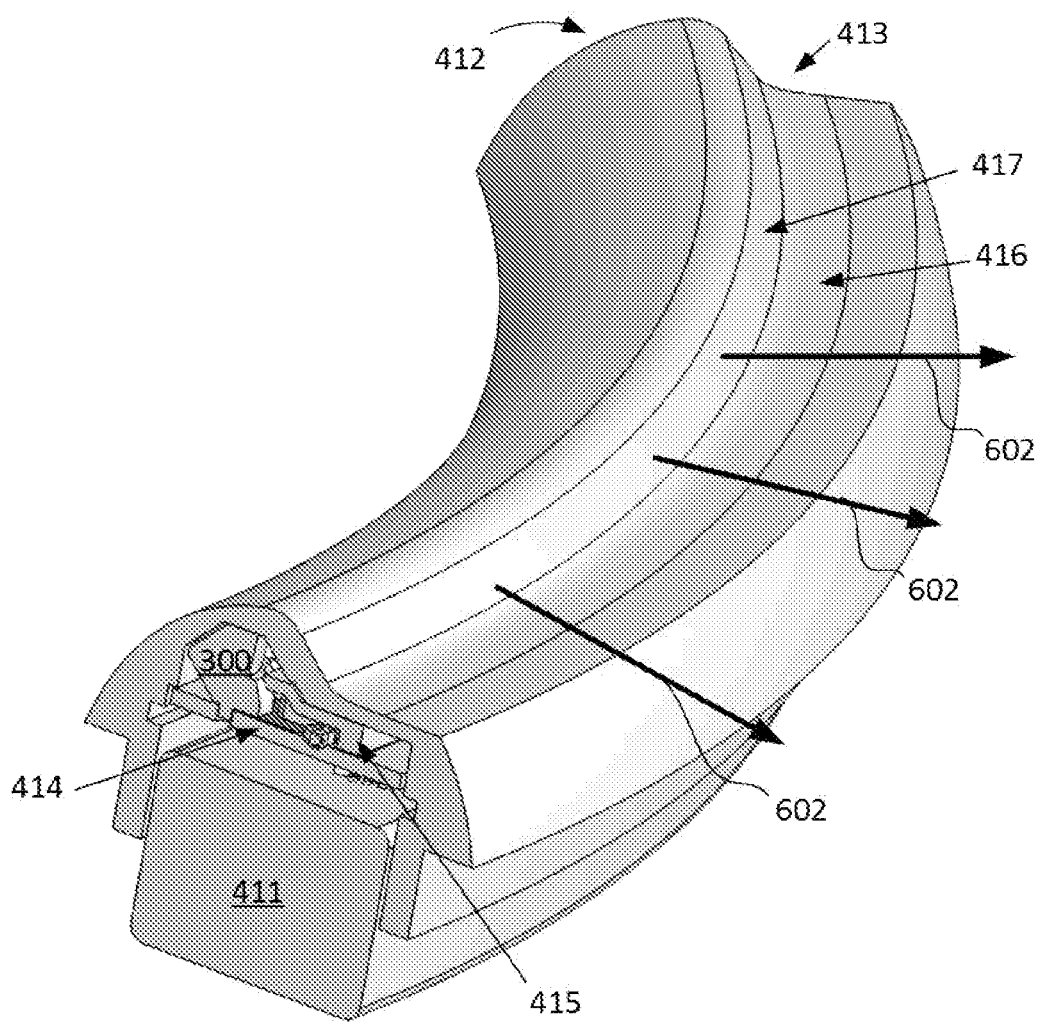
FIG. 3 is a cutaway view of a segment of the steering wheel of FIG. 2, in accordance with an embodiment of the present invention.

Reference is made to FIG. 3, which is a cutaway view of a segment of the steering wheel of FIG. 2, in accordance with an embodiment of the present invention. Thumb-receiving notch 413 is illustrated in FIG. 3. Two light transmissive portions of cover 412 are also shown in FIG. 3. A first light transmissive portion 417 forms the side wall of thumb-receiving notch 413. Light beams traveling into and out of this portion provide touch detection and proximity detection, as explained below. Three touch detection light beams 602 are shown directed radially outward from the steering wheel gripping element. The second light transmissive portion 416 forms a floor of thumb-receiving notch 413, and is used for visible illumination indicating a state of the user interface to the driver, and at which location the driver should perform additional user interface gestures.

Figure 4:
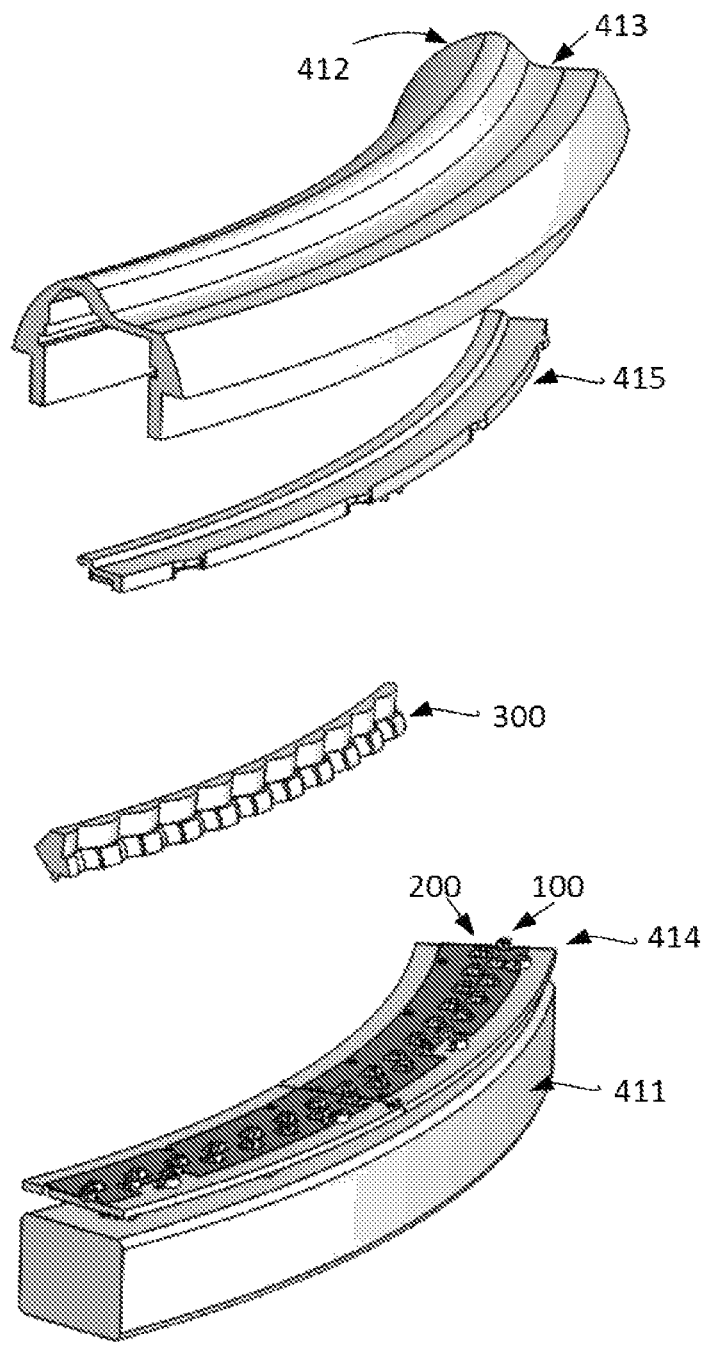
FIGS. 4 and 5 are exploded views of the steering wheel segment illustrated in FIG. 3, in accordance with an embodiment of the present invention.
Figure 5:
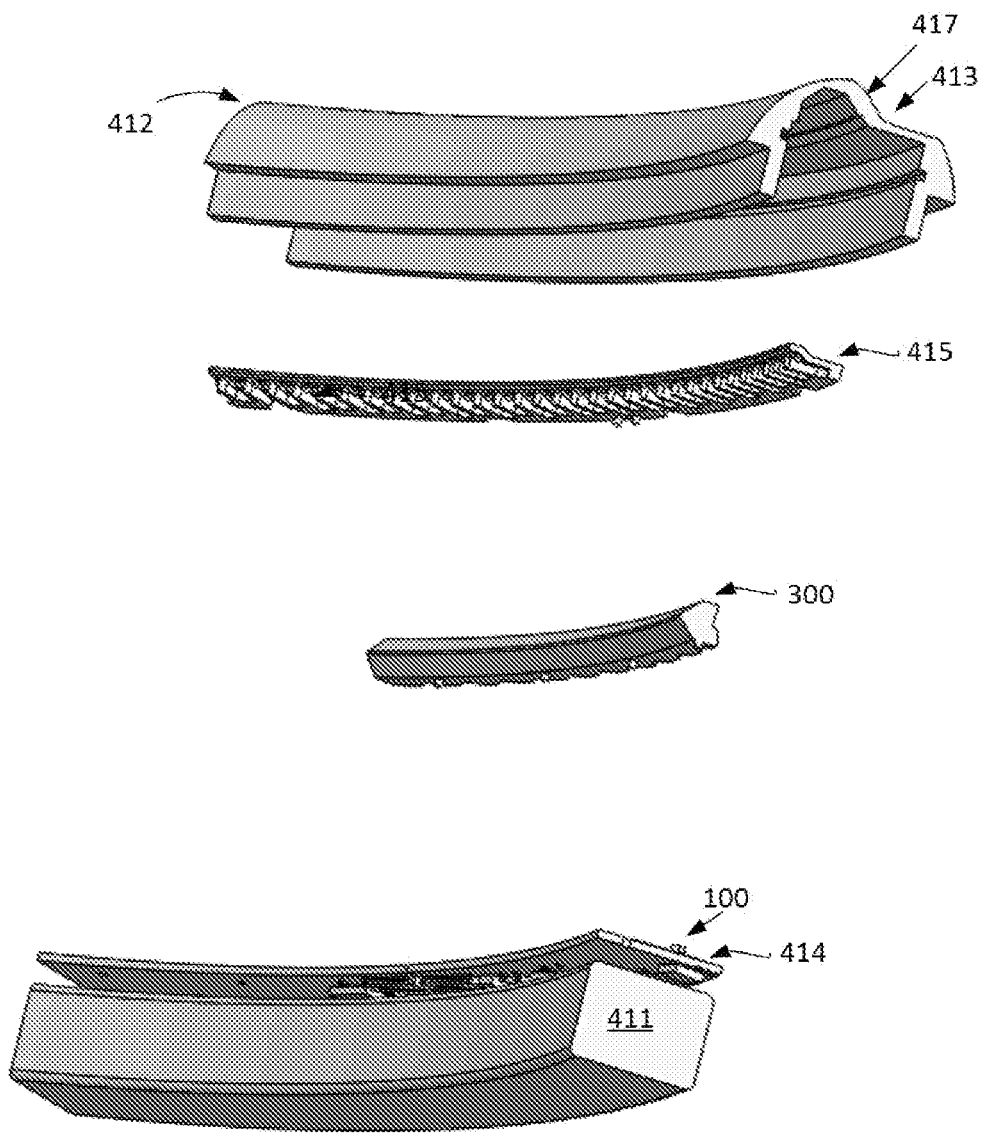
Figure 8:
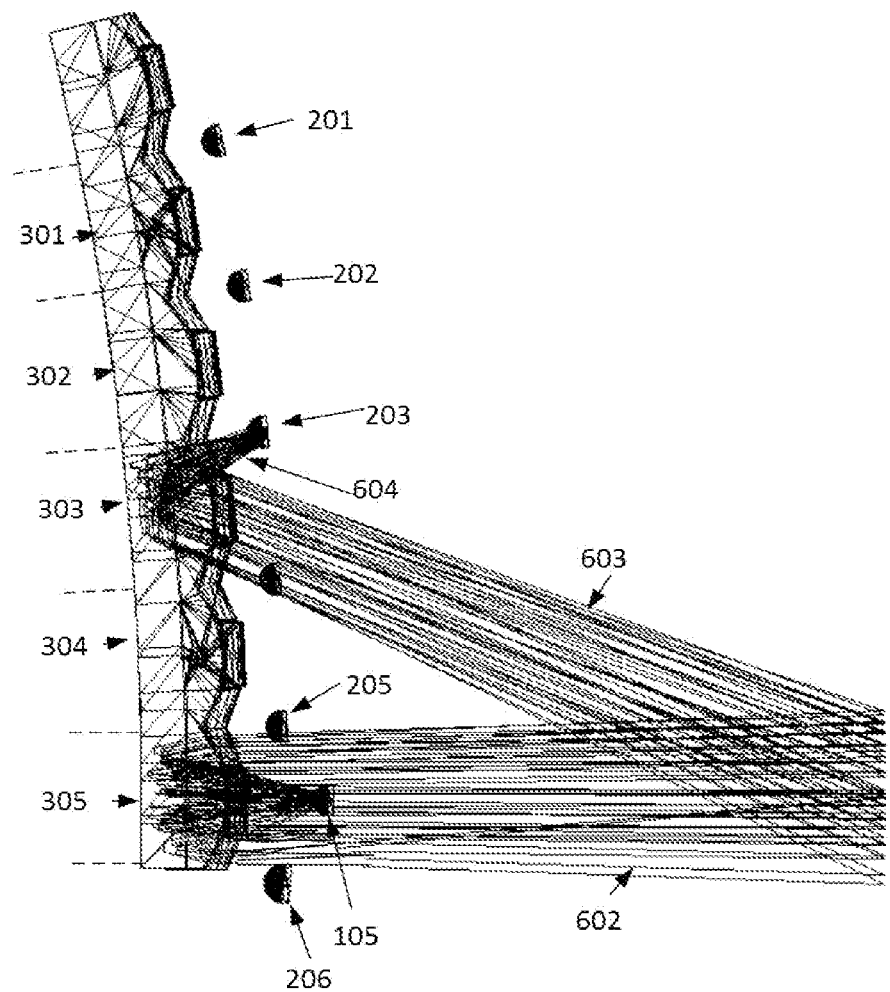
FIGS. 8 and 9 are simplified illustrations of light beams detecting an object, in accordance with an embodiment of the present invention.
Figure 9:
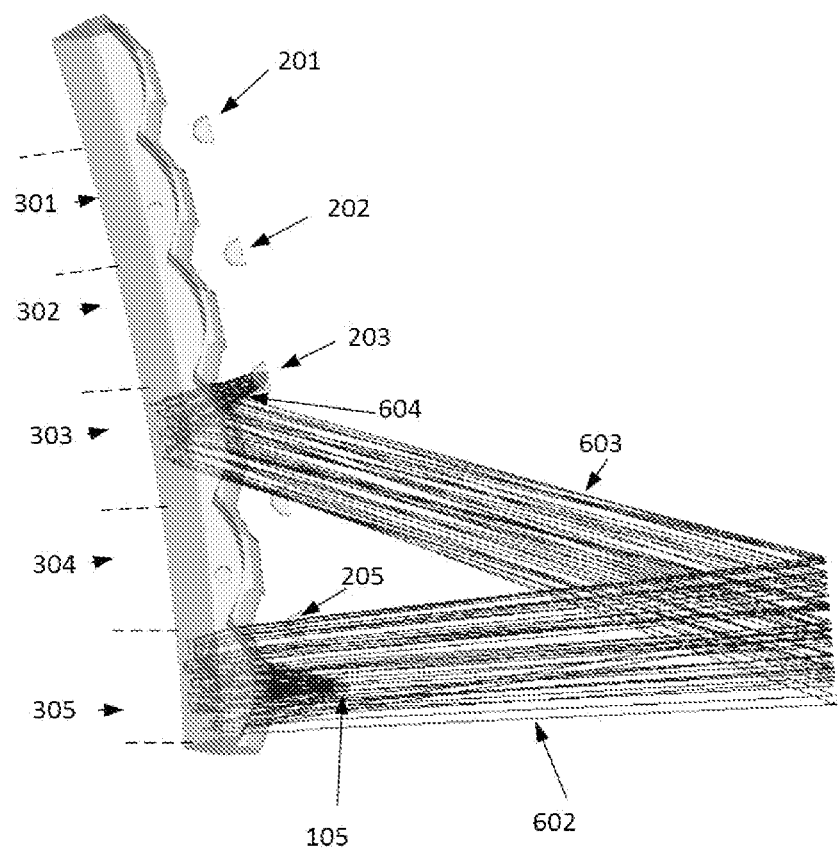

Reference is made to FIGS. 4 and 5, which are exploded views of the steering wheel segment illustrated in FIG. 3, in accordance with an embodiment of the present invention. As shown in FIG. 4, two concentric rows of elements are mounted on PCB 414. Namely, an inner row of light detectors 200 and an outer row of light emitters 100. Light from the emitters enters lenses 300 through which it is re-directed out of the steering wheel through light transmissive portion 417 as light beams 602, illustrated in FIGS. 3 and 8-10. An object such as a thumb placed in notch 413 reflects the light back through portion 417 and lenses 300 onto one or more of the light detectors 200, thereby providing touch detection, as illustrated in FIGS. 8 and 9. Similarly, an object such as a user's hand placed along the outer rim of the steering wheel outside notch 413 and opposite light transmissive portion 417 also reflects the light back through portion 417 and lenses 300 onto one or more of the light detectors 200, thereby providing proximity detection.

FIG. 5 shows an exploded view from below of the steering wheel segment illustrated in FIG. 3, in accordance with an embodiment of the present invention.

Figure 6:
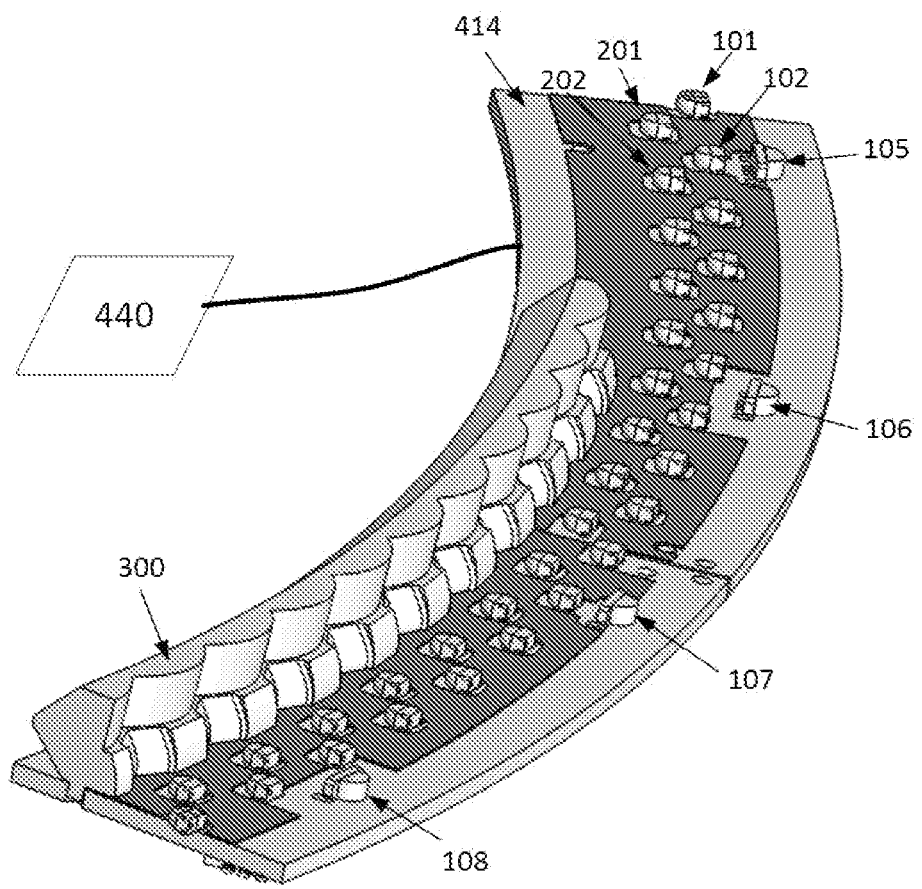
FIG. 6 is a simplified illustration of electronic components in the steering wheel segment of FIG. 2 connected to a processor, in accordance with an embodiment of the present invention.

Reference is made to FIG. 6, which is a simplified illustration of electronic components in the steering wheel segment of FIG. 2 connected to a processor, in accordance with an embodiment of the present invention. FIG. 6 shows processor 440 connected to PCB 414 on which three concentric arrangements of light elements are mounted, namely, an inner circular arrangement of inward facing light detectors, including detectors 201 and 202; a middle circular arrangement of inward facing light emitters, including emitters 101 and 102; and an outer circular arrangement of outward facing light emitters 105-108. The inward facing light emitters are used for touch and proximity detection and typically emit light in the near infrared range. Processor 440 controls activation of the emitters and detectors, and detects gestures performed on the steering wheel based on these activations and based on the outputs of the detectors.

The outward facing light emitters are used to provide visual indications to the user by illuminating light transmissive portion 416 of the steering wheel cover, and emit light in the visible range. Lenses 300 are described in assignee's co-pending application U.S. Ser. No. 14/555,731, entitled DOOR HANDLE WITH OPTICAL PROXIMITY SENSORS, the contents of which are incorporated herein in their entirety by reference.

Figure 7:
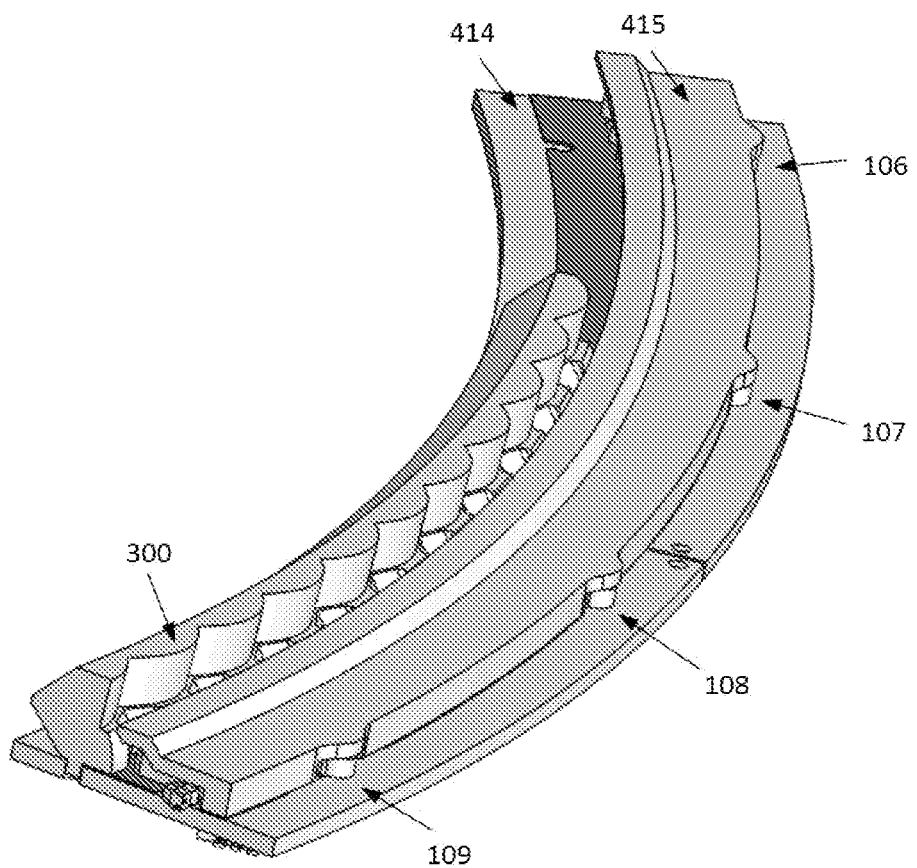
FIG. 7 is a simplified illustration of a structure of light baffles placed upon the electronic components in FIG. 6, in accordance with an embodiment of the present invention.

Reference is made to FIG. 7, which is a simplified illustration of a structure of light baffles placed upon the electronic components in FIG. 6, in accordance with an embodiment of the present invention. FIG. 7 shows PCB 414 and lenses 300 of FIG. 6, but with baffle structure 415 placed above the mounted light elements.

Reference is made to FIGS. 8 and 9, which are simplified illustrations of light beams detecting an object, in accordance with an embodiment of the present invention. FIGS. 8 and 9 show a light path used to detect an object. Shown in FIGS. 8 and 9 are individual lens structures 301-305. Each lens structure serves a respective opposite emitter and two detectors, one to the left of the emitter and one to the right of the emitter. Thus, for example, lens structure 305 serves emitter 105 and detectors 205 and 206. In addition each detector is served by two lens structures; e.g., detector 205 receives reflected light from lens structures 304 and 305. In the example shown in FIGS. 8 and 9, light from emitter 105 is reflected by an object (not shown) into lens structure 303 and onto detector 203. Three segments of the detected light are indicated in FIGS. 8 and 9; namely, light beam 602 projected outward from lens structure 305 and radially outward of the steering wheel, light beam 603 reflected by the object into lens structure 303, and light beam 604 directed by lens structure 303 onto detector 203.

Figure 10:
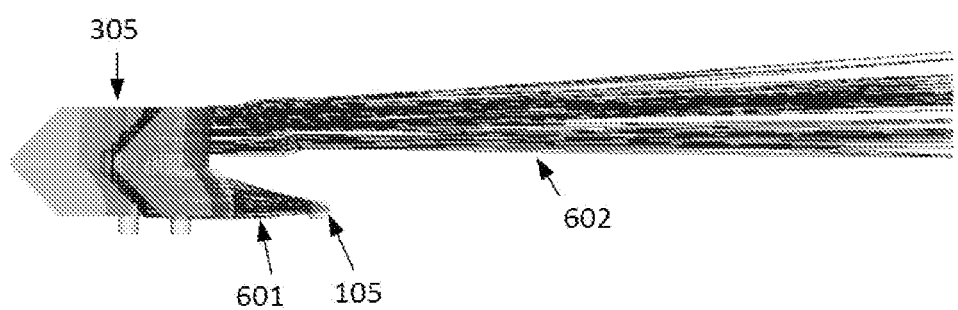
FIG. 10 is simplified side view illustration of light beams projected radially outward from a steering wheel, in accordance with an embodiment of the present invention.

Reference is made to FIG. 10, which is simplified side view illustration of light beams projected radially outward from a steering wheel, in accordance with an embodiment of the present invention. FIG. 10 shows a cutaway side view of the light path illustrated in FIGS. 8 and 9. FIG. 10 shows light beam 601 from emitter 105 entering lens structure 305, where it is redirected outward as light beam 602.

Methods for determining two-dimensional coordinates of an object detected by the disclosed proximity sensor array are described in assignee's co-pending application Ser. No. 14/312,787, entitled OPTICAL PROXIMITY SENSORS, and U.S. Ser. No. 14/555,731, entitled DOOR HANDLE WITH OPTICAL PROXIMITY SENSORS, both incorporated herein in their entireties by reference. Because the present application is for a steering wheel and the proximity sensor array is arranged along an arc-shaped grip of the steering wheel, the determined coordinates are polar coordinates, including a polar angle and a radial coordinate. The polar angle corresponds to a coordinate along the proximity sensor array, which in application Ser. Nos. 14/312,787 and 14/555,731 is described as an x-axis coordinate. The radial coordinate corresponds to a distance from the proximity sensor array, which in application Ser. Nos. 14/312,787 and 14/555,731 is described as a y-axis coordinate.

Discussion now turns to the firmware and software used to detect and interpret user gestures. There are five basic gesture components that are detected by the hardware and low level drivers: (i) Thumb-Tap, (ii) Thumb-Glide, (iii) Thumb-Long-Press, (iv) Grab and (v) Rim-Tap. These components are emitted on the network as they are detected, and are used by higher level software to assemble more complex gestures such as double-taps. Application software interprets these gestures as input commands. In some embodiments of the invention multiple client applications are connected via a network to the detector firmware. The firmware sends information for each detected gesture component over the network, and a client application translates that information into commands and/or constructs compound gestures from multiple gesture components.

Figure 11:
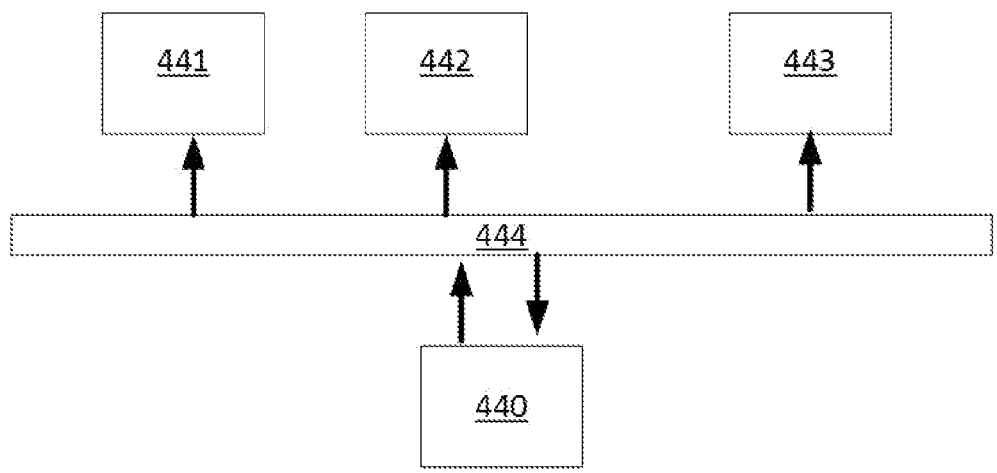
FIG. 11 is a simplified illustration of communication between touch detection firmware and multiple clients over a network, in accordance with an embodiment of the present invention.

Reference is made to FIG. 11, which is a simplified illustration of communication between touch detection firmware and multiple clients over a network, in accordance with an embodiment of the present invention. FIG. 11 shows an exemplary network architecture in which processor 440 sends detected gesture components over message bus 444, e.g., using the Message Queue Telemetry Transport (MQTT) messaging protocol on top of the TCP/IP protocol, to connected clients 441-443.

The five basic gesture components are categorized according to whether they are performed by a large object (hand) or small object (thumb), and whether the nature of the gesture component is discrete or continuous, as presented in the table below.

| Component | Description | Object | Type |
|---|---|---|---|
| Thumb-Tap | Tap thumb on steering wheel rim | Small | Discrete |
| Thumb-Glide | Glide thumb along steering wheel rim | Small | Continuous |
| Thumb-Long-Press | Hold thumb on steering wheel rim | Small | Continuous |
| Grab | Grab hold of steering wheel rim | Large | Continuous |
| Rim-Tap | Tap hand on steering wheel rim | Large | Discrete |

These gesture components are alternatively referred to as follows.

| Component | Alternative Name |
|---|---|
| Thumb-Tap | small-object tap |
| Thumb-Glide | small-object glide |
| Thumb-Long-Press | small-object touch-and-hold |
| Grab | large-object grab |
| Rim-Tap | large-object tap |

The parameters are the same for all gesture components; namely, time stamp, start angle (min_angle), end angle (max_angle), center angle (angle) and state.

The angle parameters refer to a polar angle along the steering wheel at which the object is detected. Because of the object's size, there is a first polar angle at which the object begins (start angle) and a last polar angle at which the object ends (end angle). The midpoint between the start and end angles (center angle) is used as the object's polar angle. The start and end angles are useful for determining the size of a detected object.

The state parameter takes on three values: RECOGNIZED, UPDATED and ENDED. The ENDED state is applied to all discrete gesture components, and also when a continuous gesture component ends. The RECOGNIZED and UPDATED states are only applied to continuous gesture components. The RECOGNIZED state is applied when a continuous gesture component is first detected. The UPDATED state is applied during the course of a continuous gesture component.

The discrete gesture components, Thumb-Tap and Rim-Tap, are emitted to the clients after they happen, and then only one message is sent for the gesture component. They are only sent with the state ENDED.

The continuous gesture components, Thumb-Glide, Thumb-Long-Press and Grab, are emitted to the clients intermittently from the instant that they are recognized until they end when the hand or finger leaves the rim. When they are first recognized, they are sent to the network with the state RECOGNIZED. With a configurable interval, the gesture component is reported to the network with new parameters and the state UPDATED. When the gesture component ends, the gesture component is sent with the state ENDED.

Figure 12:
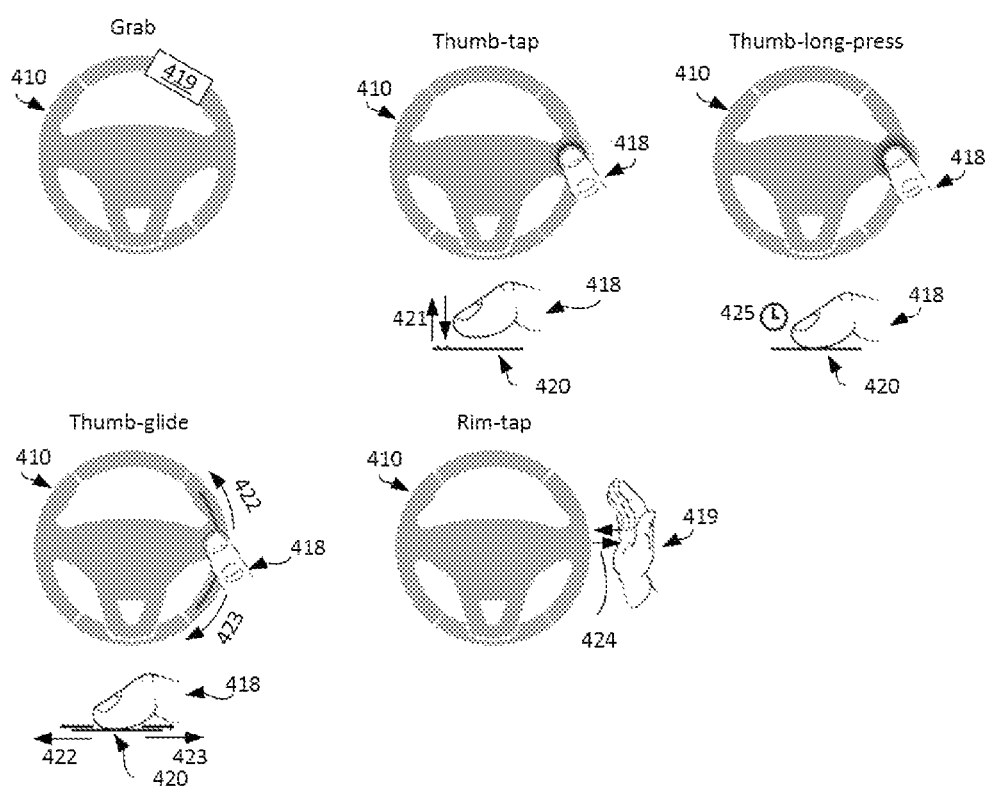
FIG. 12 is a simplified illustration of five basic gesture components used in a steering wheel user interface, in accordance with an embodiment of the present invention.

Reference is made to FIG. 12, which is a simplified illustration of five basic gesture components used in a steering wheel user interface, in accordance with an embodiment of the present invention. FIG. 12 shows the five gesture components performed by thumb 418 and hand 419 on steering wheel 410. Some gesture components are illustrated both from above and from the side. When illustrated from the side, thumb 418 is shown interacting with steering wheel surface 420.

A Thumb-Tap gesture component is generated when a small object touches the rim (or gets very close) and then is lifted from the rim within a short period. This period is configurable, but typically it is 100-200 ms. FIG. 12 shows the Thumb-Tap gesture component from above and from the side, and illustrates the movement of thumb 418 by arrows 421.

A Rim-Tap gesture component is the same as a Thumb-Tap, but for a large object such as a hand. FIG. 12 shows the Rim-Tap gesture component from the side and illustrates the movement of hand 419 by arrows 424.

A Thumb-Glide gesture component is generated when a small object touches the rim and moves at least a certain threshold distance along the rim. That distance is configurable. When it continues to move, UPDATE messages are sent when the object has moved a certain distance, also configurable. FIG. 12 shows the Thumb-Glide gesture component from above and from the side, and illustrates the movement of thumb 418 by arrows 422 and 423.

A Grab gesture component is the same as a Thumb-Glide gesture component, but for a large object touching the rim, and with the difference that the Grab gesture component does not have to move to be reported on the network. When the hand has been on the rim for a certain time threshold, the Grab gesture component is recognized and messages are intermittently sent to the network. FIG. 12 shows the Grab gesture component from above by showing hand 419 gripping steering wheel 410.

A Thumb-Long-Press gesture component is generated when a small object is present, and not moving, on the rim. When the small object has been present for a certain time, messages are sent intermittently to the network about the gesture component. If the object starts moving, the Thumb-Long-Press gesture component is ended and a Thumb-Glide gesture component is started instead. FIG. 12 shows the Thumb-Long-Press gesture component from above and from the side. Clock icon 425 indicates the time threshold required to distinguish this gesture component from a Thumb-Tap.

As mentioned above, gesture components are combined into compound user interface gestures. In some cases, environment conditions at the gesture location are combined with the gesture component to define a gesture. For example, a Thumb-Tap gesture performed at one end of an illuminated portion of the rim is translated into a first command, and a Thumb-Tap gesture performed at the other end of the illuminated portion of the rim is translated into a second command. The following table lists the different gestures and compound gestures in the steering wheel user interface, the gesture components that make up each gesture, additional gesture parameters, and example context and commands for each gesture.

| Gesture | Gesture Components | Additional Parameters | Example Context | Example Command |
| --- | --- | --- | --- | --- |
| Tap inside notch | Thumb-Tap | Thumb-tap performed at top or bottom of illuminated portion of illuminated segment of steering wheel | Cruise control is active | Increase or decrease cruise control speed in 5 mph increments |
| Tap on steering wheel outer rim | Rim-Tap | | During phone call | Reactivate phone interaction, e.g., when phone call is active for set period of time. Enables hanging up the phone call with a clockwise swipe gesture |
| Single object double-tap inside notch | Two Thumb-Taps | Thumb-taps have different time stamps, similar center angles | Vehicle is in motion | Activate cruise control and illuminate location of double-tap |
| Single object double-tap on steering wheel outer rim | Two Rim-Taps | Side of steering wheel rim (left or right) at which double-tap is performed | Car is not moving, and Park Assist icon is displayed on HUD | Activate Park Assist to park on left or right side of car, based on tapped side of rim |
| Multi-touch double-tap inside notch | Two Thumb-Taps | Thumb-taps have similar time stamps, different center angles | Autonomous drive is not active | Activate autonomous drive |
| Extended touch inside notch | Thumb-Long-Press | Thumb-long-press performed at top or bottom of illuminated portion of illuminated segment of steering wheel | Cruise control is active | Increase or decrease cruise control speed in 1 mph increments |

-continued

| Gesture | Gesture Components | Additional Parameters | Example Context | Example Command |
| --- | --- | --- | --- | --- |
| Grab | Grab | | Autonomous drive is active | Deactivate autonomous drive, and enter cruise control mode |
| Swipe | Thumb-Glide | clockwise/counter-clockwise | Cruise control is active | Increase or decrease distance from forward car in cruise control mode |
| Radial swipe | Thumb-Glide | Thumb-glide data structures have similar center angles and different radial coordinates | Cruise control is active | Open cruise control menu on HUD |
| Slide | Grab | Grab data structures have different time stamps and different center angles | Portion of steering wheel is selectively illuminated | Move illumination to new hand location (follow slide movement) |
| Switch hands | Grab | Grab data structures have different time stamps and different center angles | Portion of steering wheel is selectively illuminated | Move illumination to new hand location (jump to other side of wheel) |

Figure 13:
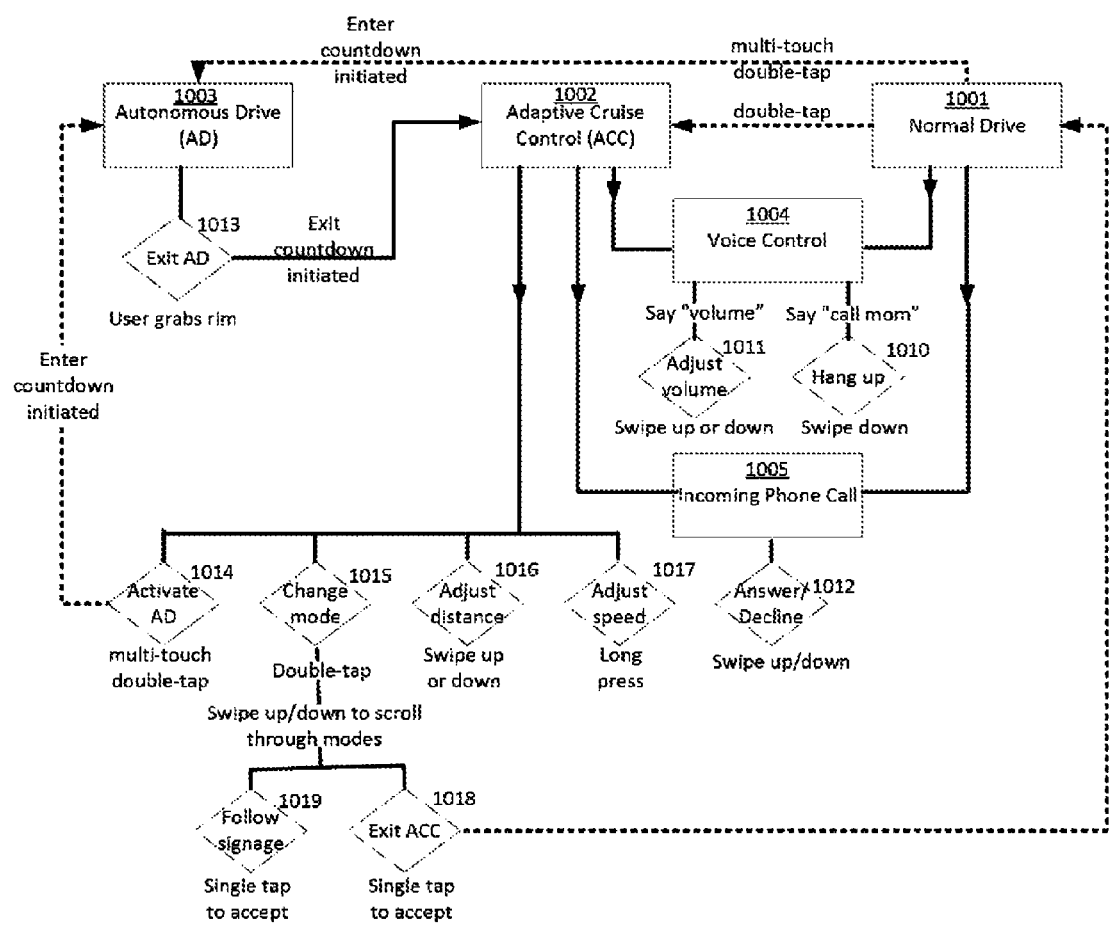
FIG. 13 is a flowchart of an exemplary vehicle user interface, in accordance with an embodiment of the present invention.

Reference is made to FIG. 13, which is a flowchart of an exemplary vehicle user interface, in accordance with an embodiment of the present invention. The flowchart illustrates the different application states, different commands within each state, and the gestures used to issue those commands. The details of the gestures are illustrated in FIGS. 14-19. In some embodiments a heads-up display (HUD) is provided.

The flowchart of FIG. 13 illustrates a highway scenario that includes three driving modes: Normal Drive 1001, Adaptive Cruise Control 1002 and Autonomous Drive 1003. In Normal Drive mode, the driver steers the vehicle and controls its speed. In Adaptive Cruise Control mode the driver steers the vehicle but the vehicle's speed, its distance from the next vehicle on the road, and other parameters are controlled by the vehicle. In Autonomous Drive mode the vehicle is driven and steered automatically without driver input.

The user enters Adaptive Cruise Control mode from Normal Drive mode by performing a double-tap gesture. The user enters Autonomous Drive mode from Normal Drive mode and from Adaptive Cruise Control mode by performing a multi-touch double-tap gesture. These gestures are described below. In order to alert the driver that Autonomous Drive mode will begin shortly, the steering wheel is illuminated with an illumination pattern that indicates a countdown until Autonomous Drive is activated.

The user exits Adaptive Cruise Control mode by performing a double-tap gesture that opens a menu on the HUD for changing the mode 1015 of cruise control. The user performs clockwise or counter-clockwise swipe gestures to scroll through the different modes on the HUD, and performs a single-tap gesture to select the displayed mode. One of the modes is Exit ACC 1018, and selecting this mode exits Adaptive Cruise Control. Another mode configures the cruise control application to follow the road signage 1019.

The user exits Autonomous Drive mode 1013 by grabbing the rim of the steering wheel. In order to alert the driver that Autonomous Drive mode is about to exit, the steering wheel is illuminated with an illumination pattern that indicates a countdown until Autonomous Drive is deactivated. Upon exiting Autonomous Drive mode, the vehicle enters Adaptive Cruise Control mode.

In Adaptive Cruise Control mode 1002 the user adjusts a distance 1016 between the vehicle and the vehicle directly in front of it, by performing a clockwise or counter-clockwise swipe gesture. The user adjusts the speed of the vehicle by performing either a tap gesture or an extended touch gesture. When the vehicle enters Adaptive Cruise Control mode 1002 a segment of the steering wheel is illuminated. A tap gesture or extended touch gesture at one end of the illuminated segment increases the vehicle speed, and a tap gesture or extended touch gesture at the other end of illuminated segment decreases the vehicle speed.

A voice control state 1004 can be entered from Normal Drive mode and Adaptive Cruise Control mode. In this state, the user can initiate a phone call by saying "call" and the name of a contact from his phone's contact list. Once the call has been connected, the user can hang up 1010 by performing a clockwise swipe gesture. The user can also adjust the volume 1011 by saying the word "volume" and then performing a counter-clockwise swipe gesture to raise the volume, or a clockwise swipe gesture to lower the volume.

When an incoming phone call 1005 is received, the user can answer the call 1012 by performing a counter-clockwise swipe gesture, or decline the call 1012 by performing a clockwise swipe gesture.

Figure 14:
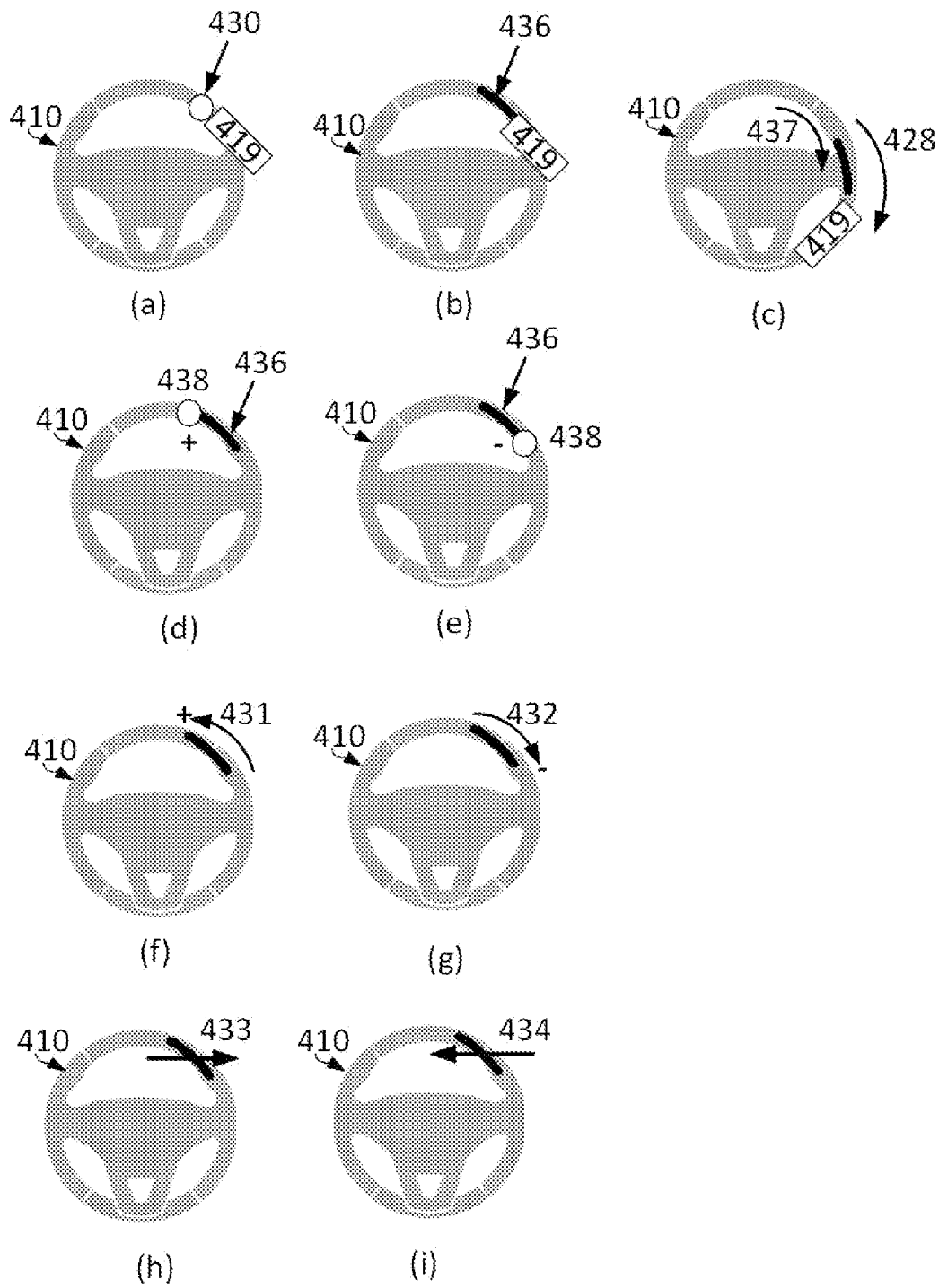
FIG. 14 is a simplified illustration of user interface gestures performed on a steering wheel for an exemplary adaptive cruise control function, in accordance with an embodiment of the present invention.

Reference is made to FIG. 14, which is a simplified illustration of user interface gestures performed on a steering wheel for an exemplary adaptive cruise control function, in accordance with an embodiment of the present invention. In order to enter Adaptive Cruise Control mode from Normal Drive mode the user performs a single object double-tap gesture. Namely, the user taps twice with his thumb on the thumb notch in the steering wheel. This gesture is illustrated in drawing (a) in FIG. 14, showing steering wheel 410, hand 419 gripping steering wheel 410, and double-tap gesture 430. The present invention enables the user to perform the double-tap gesture 430 at any location along the perimeter of steering wheel 410.

When Adaptive Cruise Control is active the user has four options; namely, adjust cruise control speed, adjust the distance between the vehicle and the vehicle ahead, open an adaptive cruise control menu, and activate Autonomous Drive mode. As mentioned above Adaptive Cruise Control is activated when the user taps twice with his thumb in the steering wheel thumb notch. The location of these taps is subsequently illuminated to indicate to the user where to perform future gestures. This is illustrated in drawing (b) in FIG. 14, showing illuminated segment 436 of the steering wheel 410 at the location at which double-tap 430 was performed. Thus, to increase the cruise control speed the user performs a gesture, e.g. a single-tap, above the illuminated portion. This is illustrated in drawing (d) in FIG. 14 showing tap gesture 438 at the counter-clockwise edge of illuminated portion 436. The "+" indicates that this gesture increases the speed of the vehicle. Drawing (e) in FIG. 14 shows gesture 438 performed at the clockwise end of illuminated portion 436, and the "−" indicates that the gesture decreases the speed of the vehicle.

If the user slides his hand 419 along steering wheel 410, the illuminated portion 436 moves with the hand so that the user's thumb is always next to the illuminated portion of the steering wheel. This is illustrated in drawing (c) in FIG. 14, in which hand 419 gripping steering wheel 410 slides clockwise as indicated by arrow 428, and illuminated portion 436 also slides in the same direction as indicated by arrow 437.

In some embodiments the cruise control speed is also adjusted in response to extended touch gestures above and below the illuminated portion of the steering wheel. For example, the speed is adjusted by 5 km/h in response to a tap gesture, and is adjusted by 1 km/h in response to an extended touch gesture.

In order to increase or decrease the distance between the vehicle and the vehicle in front of it on the road, the user performs clockwise and counter-clockwise swipe gestures. These are illustrated in drawings (f) and (g) in FIG. 14. Drawing (f) illustrates a counter-clockwise gesture 431 to increase the distance between vehicles, and drawing (g) illustrates a clockwise gesture 432 to decrease the distance between vehicles.

In order to change the mode of Adaptive Cruise Control the user performs a radial swipe gesture with his thumb across the width of the steering wheel thumb notch. This is illustrated in drawings (h) and (i) in FIG. 14. Drawing (h) illustrates swipe gesture 433 that moves outward across the width of illuminated portion 436. Drawing (i) illustrates swipe gesture 434 that moves inward across the width of illuminated portion 436. Either gesture causes the HUD to present a mode option for selection. The user performs a single-tap gesture with his thumb in the steering wheel notch to accept the displayed mode. The mode displayed in the HUD is changed in response to a swipe gesture. For example, a first mode is to follow road signage. If the user performs a single-tap when this mode is displayed on the HUD, a Follow Road Signage mode is activated. If the user swipes clockwise or counter-clockwise, a next or previous mode is displayed such as exit Adaptive Cruise Control. The user performs a single-tap to activate this mode. If no interaction from the user is received within a fixed amount of time, such as 5 seconds, then the change mode user interface is deactivated.

Figure 15:
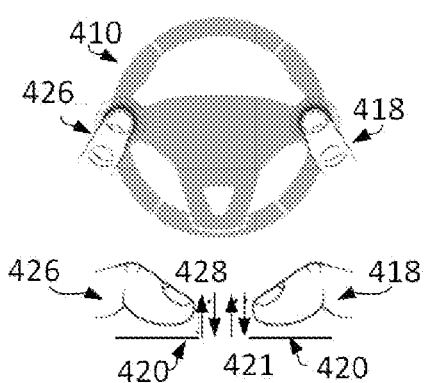
FIG. 15 is a simplified illustration of a multi-touch double-tap gesture and an exemplary user interface to activate an autonomous drive mode, in accordance with an embodiment of the present invention.
Figure 15:
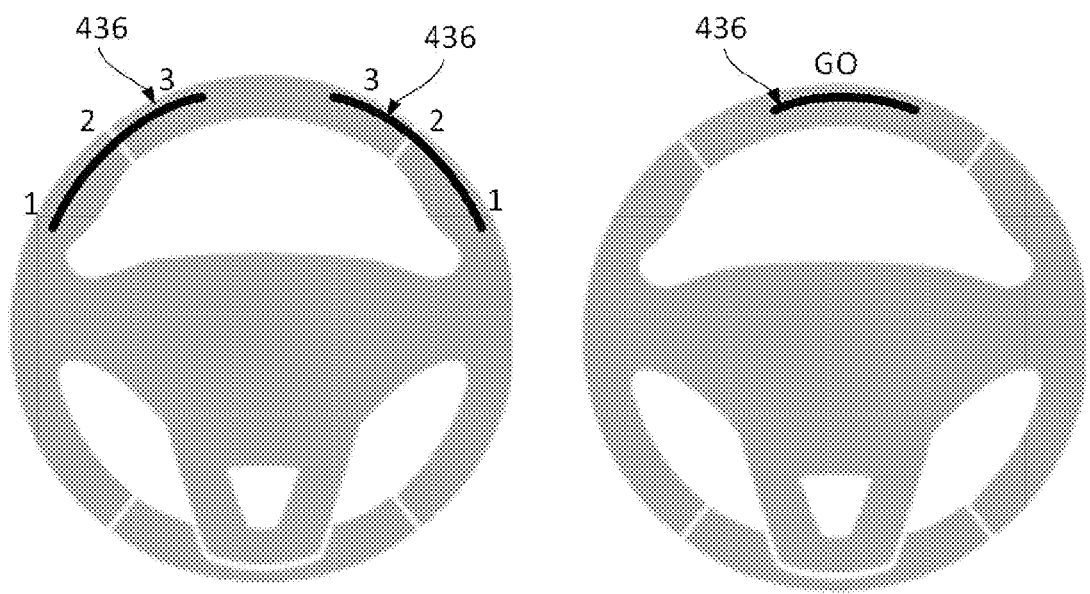

Reference is made to FIG. 15, which is a simplified illustration of a multi-touch double-tap gesture and an exemplary user interface to activate an autonomous drive mode, in accordance with an embodiment of the present invention. Drawing (a) in FIG. 15 illustrates two fingers, 418 and 426, simultaneously tapping at two locations on steering wheel 410. The upper part of this drawing is a view from above, and the lower part of this drawing is a view from the side of each of the fingers 418 and 426. The tap gesture is a brief down and up gesture illustrated by arrows 421 and 428 touching surface 420 of the steering wheel.

Once the user performs this multi-touch double-tap gesture, a series of locations on the steering wheel are sequentially illuminated over time to indicate a countdown until Autonomous Drive is activated, as illustrated in drawings (b) and (c). For example, viewing the upright steering wheel as a clock, drawing (b) illustrates a sequence of illuminations that begins with (i) the 2:30 and 9:30 clock positions indicated by a 1; followed by (ii) the 1:30 and 10:30 clock positions indicated by 2; followed by (iii) the 12:30 and 11:30 clock positions indicated by 3. Drawing (c) illustrates finally illuminating the 12 o'clock position indicated by the word "Go" to inform the user that Autonomous Drive is activated and the user can safely take his hands off the wheel.

Figure 16:
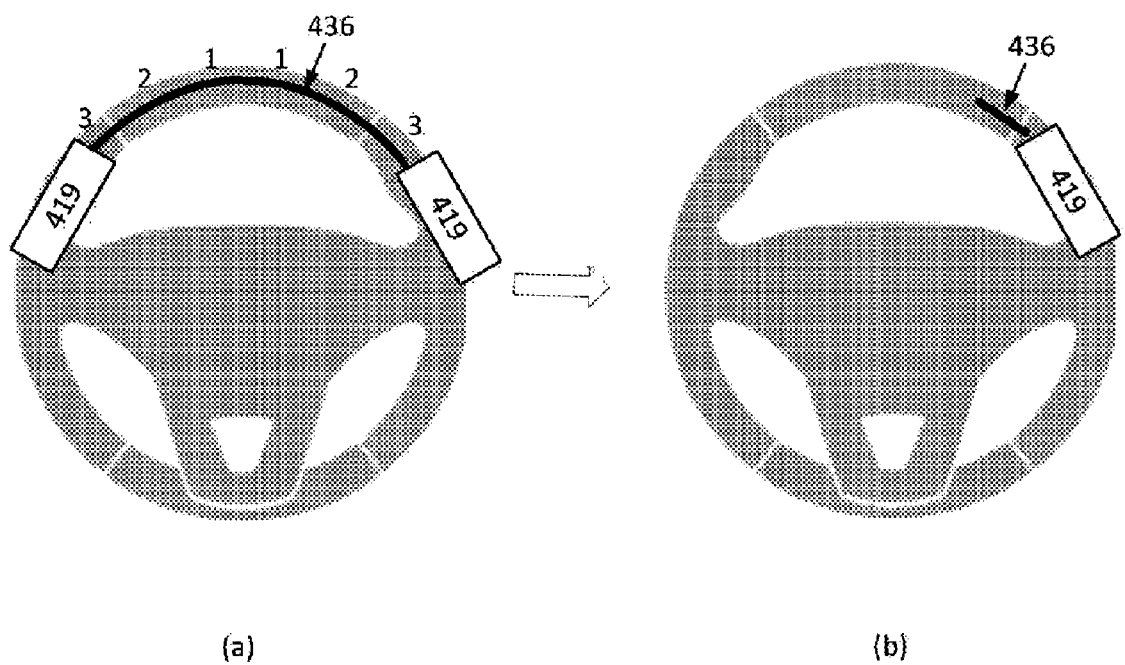
FIG. 16 is a simplified illustration of a gesture and an exemplary user interface for exiting the autonomous drive mode, in accordance with an embodiment of the present invention.

In order to exit Autonomous Drive mode and enter Adaptive Cruise Control mode, the user grabs the steering wheel. Reference is made to FIG. 16, which is a simplified illustration of a gesture and an exemplary user interface for exiting autonomous drive mode, in accordance with an embodiment of the present invention. FIG. 16 shows two hands 419 gripping steering wheel 410, in accordance with an embodiment of the present invention. A series of locations on the steering wheel is then sequentially illuminated to indicate that Autonomous Drive mode is about to be the deactivated. For example, drawing (a) illustrates a sequence of illuminations that begins with (i) the 11:30 and 12:30 clock positions indicated by a 1; followed by (ii) the 10:30 and 1:30 clock positions indicated by 2; followed by (iii) the 9:30 and 2:30 clock positions indicated by 3. When Autonomous Drive mode is deactivated the vehicle enters Adaptive Cruise Control mode, and a portion 436 of steering wheel 410 next to one of the hands 419 gripping the steering wheel is illuminated, as illustrated in drawing (b) of FIG. 16, and as discussed above with reference to FIG. 14.

In both Normal Drive mode and Adaptive Cruise Control mode the user can enable voice activated controls by tapping twice on the outer rim of the steering wheel. When voice-activated controls are enabled the user disables these controls by repeating the same double-tap gesture.

Two voice-activated controls are illustrated in FIG. 13: placing a phone call and enabling volume adjustments. To place a phone call the user says "call" and the name of the person to call, e.g., "call Mom". In order to hang up the call the user performs a swipe gesture along the thumb notch in the steering wheel. To adjust the volume of a call or the stereo system, the user says the word "volume" and then adjusts the volume up or down by swiping clockwise or counter-clockwise along the thumb notch in the steering wheel.

Figure 17:
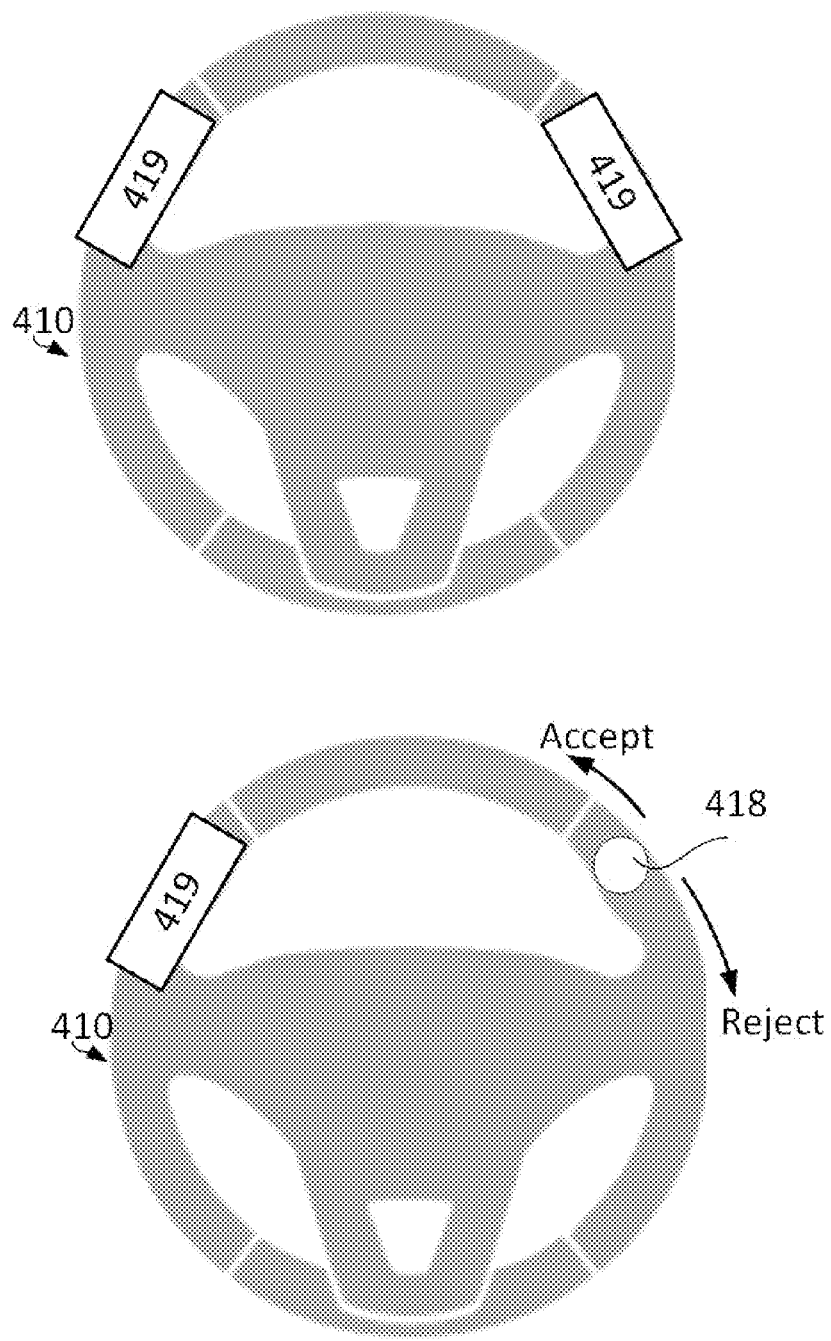
FIG. 17 is a simplified illustration showing how an incoming call is received, in accordance with an embodiment of the present invention.

Reference is made to FIG. 17, which is a simplified illustration showing how an incoming call is received, in accordance with an embodiment of the present invention. FIG. 17 shows that when an incoming call is received, the user answers or declines the call by swiping finger 418 clockwise or counter-clockwise along the thumb notch of the steering wheel, e.g. swipe counter-clockwise to accept the call and swipe clockwise to reject the call.

Figure 18:
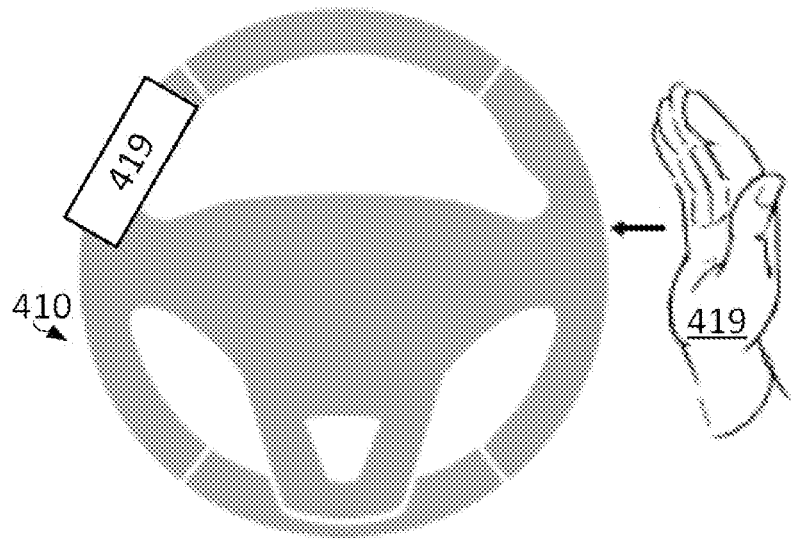
FIG. 18 is a simplified illustration showing how to hang up a call, in accordance with an embodiment of the present invention.
Figure 18:
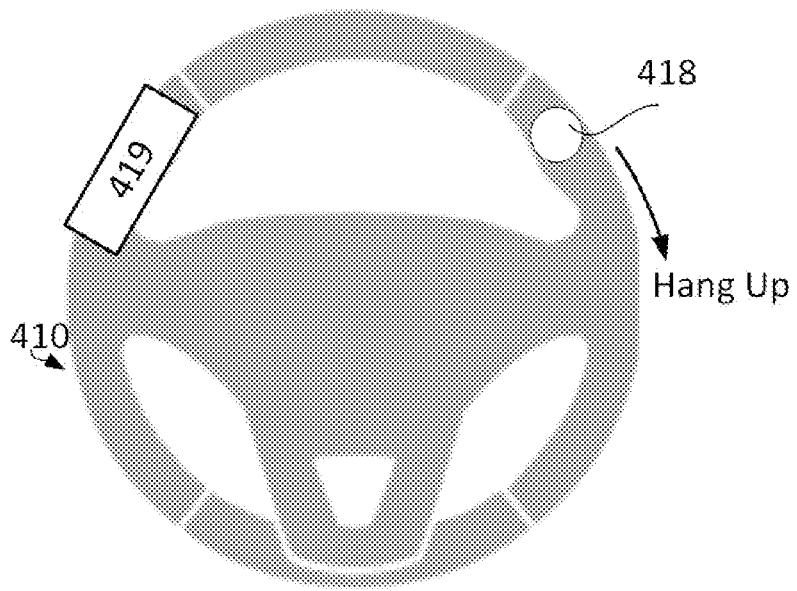

Reference is made to FIG. 18, which is a simplified illustration showing how to hang up a call, in accordance with an embodiment of the present invention. The gesture to hang up a call is a clockwise swipe gesture. However, when a call has been active for a certain amount of time, the system ignores clockwise swipe gestures so that the user does not inadvertently hang up the call. In order to hang up the call, the user first taps the outer rim of the steering wheel, as shown by hand 419, to indicate that the system should respond to the next swipe gesture, followed by a clockwise swipe gesture by finger 418 to hang up the call.

Figure 19:
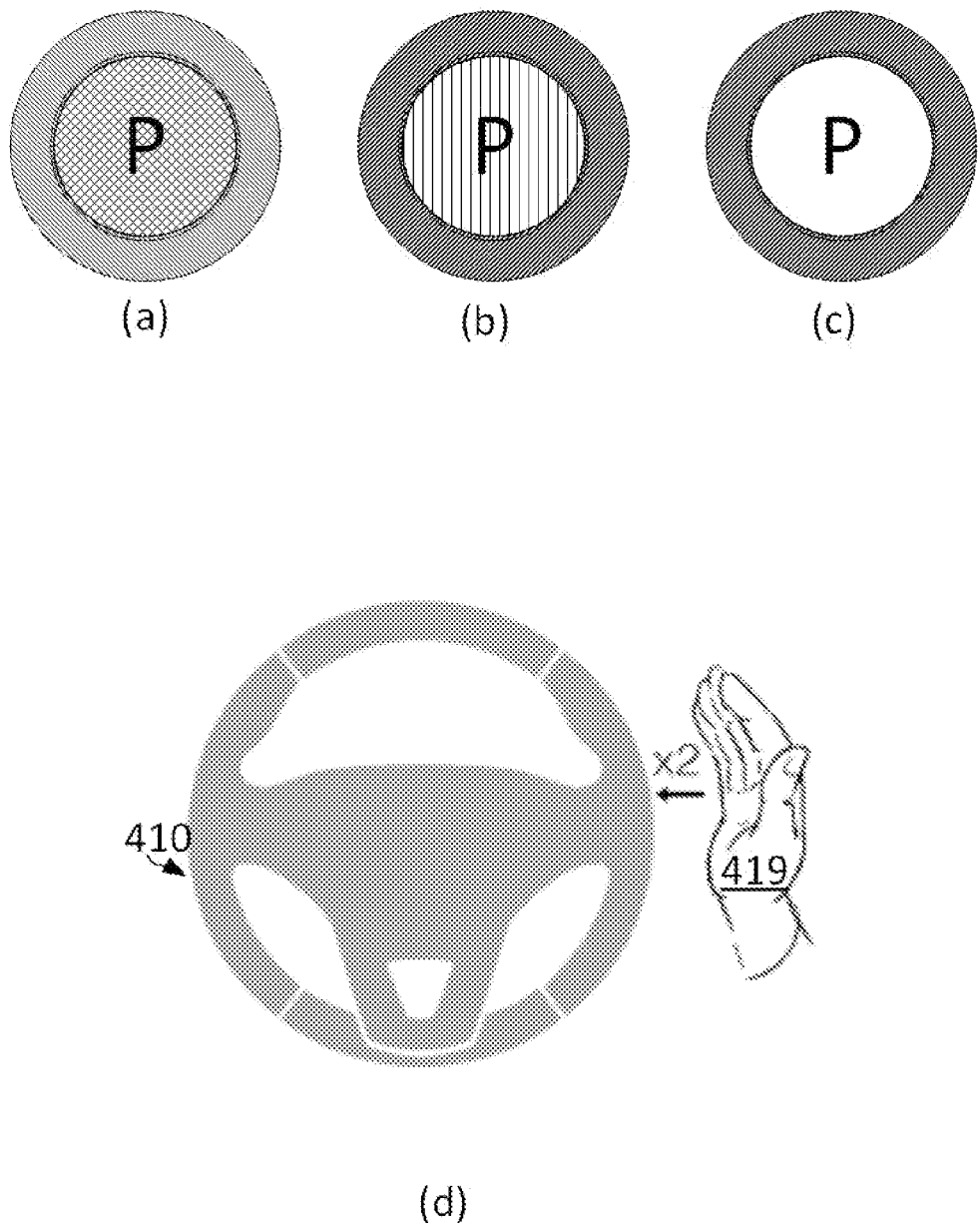
FIG. 19 is a simplified illustration of a user interface for a park assist function, in accordance with an embodiment of the present invention.

In a city scenario the user interface provides a park assist function that automatically parks the car without the user's intervention. Reference is made to FIG. 19, which is a simplified illustration of a user interface for a park assist function, in accordance with an embodiment of the present invention. When the vehicle is moving at less than 30 km/h, the Park Assist function begins automatically scanning for available parking spaces. In addition, a faded Park Assist icon appears on the HUD, as illustrated in drawing (a) of FIG. 19. As the car further slows down, this icon becomes bolder until the car has stopped moving, as illustrated in drawings (b) and (c) of FIG. 19. The HUD then presents information about available parking spots; e.g. whether the vehicle can fit into that spot. The user performs a double-tap on the outer rim of the steering wheel, as illustrated in drawing (d), by hand 419 to begin the automated parking. To indicate to the Park Assist function that the parking space is on the left side of the car, the user performs this double-tap on of the left half of steering wheel rim. To indicate to the Park Assist function that the parking space is on the right side of the car, the user performs this double-tap on of the right half of steering wheel rim.

In the foregoing specification, the invention has been described with reference to specific exemplary embodiments thereof. It will, however, be evident that various modifications and changes may be made to the specific exemplary embodiments without departing from the broader spirit and scope of the invention. In particular, sensors other than optical sensors may be used to implement the user interface, inter alia capacitive sensors disposed along the circumference of the steering wheel, and cameras that captured images of the steering wheel. Accordingly, the specification and drawings are to be regarded in an illustrative rather than a restrictive sense.

What is claimed is:

1. A non-transitory computer readable medium storing instructions which, when executed by a processor connected to a curved touch-sensitive user input device, cause the processor to generate one or more data structures for an object moving along the perimeter of the curved user input device, each data structure corresponding to a component gesture and comprising:
   a) a time stamp,
   b) a polar angle at which the moving object starts,
   c) a polar angle at which the moving object ends,
   d) a middle polar angle of the moving object, and
   e) an assigned state being one of the group RECOGNIZED, UPDATED and ENDED,
wherein the instructions cause the processor to assign the RECOGNIZED state to the data structure when the moving object is initially detected on the perimeter of the user input device, to assign the UPDATED state to the data structure when the moving object is further detected on the perimeter of the user input device after the initial detection, and to assign the ENDED state to the data structure when the moving object ceases to be detected on the perimeter of the user input device.

2. The computer readable medium of claim 1 wherein the instructions cause the processor to discriminate between large and small objects based on the polar angles in the data structure.

3. The computer readable medium of claim 2 wherein the instructions cause the processor to identify a component gesture of the moving object as consisting of one of the types: (i) a small-object tap gesture, (ii) a small-object glide gesture, (iii) a small-object touch-and-hold gesture, (iv) a large-object tap gesture, and (v) a large-object grab gesture.

4. The computer readable medium of claim 3 wherein the instructions cause the processor to combine at least two component gestures of the same type, having assigned states ENDED, to further identify a compound gesture.

5. The computer readable medium of claim 4 wherein the compound gesture is a double-tap gesture, combining two small-object tap gestures.

6. The computer readable medium of claim 3 wherein the instructions cause the processor to combine at least two component gestures of the same type, having assigned states RECOGNIZED and UPDATED, to further identify a compound gesture.

7. The computer readable medium of claim 6 wherein the compound gesture is a swipe gesture, combining two small-object glide gestures having different middle polar angles.

8. The computer readable medium of claim 6 wherein the compound gesture is a slide gesture, combining two consecutive large-object grab gestures having different middle polar angles.

9. The computer readable medium of claim 8, wherein the user input device comprises visible light illumination means connected to the processor, and the instructions cause the processor to selectively illuminate locations on the user input device perimeter in accordance with the polar angles of the detected slide gesture.

10. The computer readable medium of claim 6 wherein the compound gesture is an extended touch gesture, combining two consecutive small-object touch-and-hold gestures.

11. The computer readable medium of claim 1 wherein the instructions cause the processor to determine a radial coordinate of the object, and to combine at least two component gestures having similar middle polar angles and different radial coordinates to identify a radial swipe gesture.

12. The computer readable medium of claim 11 wherein the instructions cause the processor to open a menu of options for an active application on a display in response to an identified radial swipe gesture.

13. The computer readable medium of claim 1 wherein the user input device comprises visible light illumination means connected to the processor, and the instructions cause the processor to combine at least two component gestures to further identify a compound gesture, and to selectively illuminate that portion of the user input device perimeter at which the compound gesture is performed.

14. The computer readable medium of claim 13 wherein the instructions cause the processor to issue a first command in response to a first gesture identified at one end of the illuminated portion, and cause the processor to issue a second command in response to a second gesture identified at the other end of the illuminated portion, the second command being an opposite of the first command.

15. The computer readable medium of claim 13 wherein the instructions cause the processor to issue a first command in response to a first sweep gesture in a first direction along the illuminated portion, and cause the processor to issue a second command in response to a second sweep gesture in the direction opposite the first direction along illuminated portion, the second command being an opposite of the first command.

* * * * *